(12) United States Patent
Williams et al.

(10) Patent No.: US 8,000,973 B2
(45) Date of Patent: *Aug. 16, 2011

(54) MANAGEMENT OF CONVERSATIONS

(75) Inventors: David Williams, Carlisle, MA (US); Jeffrey Hill, Westford, MA (US); Yuri Zieman, Waltham, MA (US)

(73) Assignee: Microsoft Corporation, Redmond, WA (US)

( * ) Notice: Subject to any disclaimer, the term of this patent is extended or adjusted under 35 U.S.C. 154(b) by 202 days.

This patent is subject to a terminal disclaimer.

(21) Appl. No.: 12/364,807

(22) Filed: Feb. 3, 2009

(65) Prior Publication Data
US 2009/0228264 A1    Sep. 10, 2009

Related U.S. Application Data

(63) Continuation of application No. 10/939,288, filed on Sep. 10, 2004, now Pat. No. 7,606,714, which is a continuation-in-part of application No. 10/364,662, filed on Feb. 11, 2003, now abandoned, application No. 12/364,807, which is a continuation of application No. 11/218,925, filed on Sep. 2, 2005, now Pat. No. 7,487,095, which is a continuation of application No. 10/364,662, filed on Feb. 11, 2003, now abandoned.

(51) Int. Cl.
*G06F 17/20* (2006.01)
*G10L 15/22* (2006.01)

(52) U.S. Cl. ...................................... 704/275
(58) Field of Classification Search .................... 704/275
See application file for complete search history.

(56) References Cited

U.S. PATENT DOCUMENTS

| | | | |
|---|---|---|---|
| 5,555,169 A | 9/1996 | Namba et al. | |
| 5,895,466 A | 4/1999 | Goldberg et al. | 707/5 |
| 5,960,384 A | 9/1999 | Brash | 704/9 |
| 5,963,940 A | 10/1999 | Liddy et al. | 707/5 |
| 6,182,029 B1 | 1/2001 | Friedman | |
| 6,243,684 B1 | 6/2001 | Stuart et al. | 704/275 |
| 6,377,944 B1 | 4/2002 | Busey et al. | 707/3 |
| 6,496,799 B1 | 12/2002 | Pickering | 704/235 |
| 6,587,558 B2 | 7/2003 | Lo | 379/265.09 |
| 6,604,094 B1 | 8/2003 | Harris | 706/48 |
| 6,718,367 B1 | 4/2004 | Ayyadurai | 709/206 |

(Continued)

FOREIGN PATENT DOCUMENTS

WO    WO 99/53676    10/1999

(Continued)

OTHER PUBLICATIONS

Second Chinese Official Action from CN Appln. No. 200580029703.6, dated Oct. 15, 2009.

(Continued)

*Primary Examiner* — Susan McFadden
(74) *Attorney, Agent, or Firm* — Merchant & Gould

(57) ABSTRACT

An embodiment of a method is disclosed wherein a natural language communication is received from a user. A concept recognition process is applied to automatically derive a representation of concepts embodied in the natural language communication. A collection of information likely to be useful in responding to the natural language communication is selected based on correspondence to the representation of concepts. The collection of information is provided to a human agent through an interface. Through the interface, an identification of a particular item of information from the collection is received. The particular item is illustratively a sub-set of the collection of information, the sub-set being a particular proposed response to the natural language communication. The particular proposed response is delivered to the user.

14 Claims, 14 Drawing Sheets

U.S. PATENT DOCUMENTS

| | | | |
|---|---|---|---|
| 6,766,316 B2 | 7/2004 | Caudill et al. | |
| 6,771,746 B2 | 8/2004 | Shambaugh et al. | 379/88.13 |
| 6,778,951 B1 | 8/2004 | Contractor | 704/9 |
| 6,829,603 B1 | 12/2004 | Chai et al. | 707/5 |
| 6,851,115 B1 | 2/2005 | Cheyer et al. | 719/317 |
| 6,915,246 B2 | 7/2005 | Gusler et al. | 703/5 |
| 6,941,266 B1 | 9/2005 | Gorin et al. | 704/257 |
| 7,219,054 B1 | 5/2007 | Begeja et al. | 704/231 |
| 7,293,013 B1 | 11/2007 | Horvitz et al. | 707/2 |
| 7,305,345 B2 | 12/2007 | Bares et al. | 704/275 |
| 7,487,095 B2 * | 2/2009 | Hill et al. | 704/275 |
| 7,606,714 B2 * | 10/2009 | Williams et al. | 704/275 |

FOREIGN PATENT DOCUMENTS

| | | |
|---|---|---|
| WO | WO 02/061730 | 8/2002 |

OTHER PUBLICATIONS

Third Party Search Submission for U.S. Appl. No. 11/218,925, filed Sep. 2, 2005.

Business Method to Improve Problem Diagnosis in Current Systems Using a Combination of XML and VoiceXML (Author IBM TBD), 1.1.02.

Knowledge Management-Improvement of Help Desk Operation by Q & A Case Referencing by Seiya and Masura (Toshiba) from Roshiba Rebyu, 2001, vol. 56, No. 5, pp. 28-31.

Practical Issues in the application of Speech Technology to Network and Customer Service Applications (Author Whittaker, Cahill, Atwater and Geenhow) Interactive Voice Technology for Telecommunications Applications ('98 IEEE $4^{th}$ Workshop), pp. 185-190.

Letter received by Applicant from a third party on Jan. 12, 2009. The letter outlines the third party's opinion as to how a certain reference corresponds to certain claims. Communication by the European Patent Office.

India Patent Appln. No. 4052/DELNP/2005 First Exam Letter dated Jan. 13, 2007.

First Chinese Official Action.

* cited by examiner

MANAGEMENT OF CONVERSATIONS

The present application is a continuation application based on and claiming the benefit of priority from U.S. patent application Ser. No. 10/939,288 filed on Sep. 10, 2004, which is a continuation-in-part of U.S. patent application Ser. No. 10/364,662, filed on Feb. 11, 2003; and the present application is also a continuation application of U.S. patent application Ser. No. 11/218,925 filed on Sep. 2, 2005, which is a continuation of U.S. patent application Ser. No. 10/364,662, filed on Feb. 11, 2003; the contents of all of these applications being hereby incorporated by reference in their entirety.

BACKGROUND

This invention relates to management of conversations.

One application in which conversations are managed is in customer contact centers. Customer contact centers, e.g. call centers, have emerged as one of the most important and dynamic areas of the enterprise in the new economy. In today's tough economic environment, cost-effectively serving and retaining customers is of strategic importance. Most companies realize that keeping satisfied customers is less expensive than acquiring new ones. As the enterprise touch point for more than half of all customer interactions, the contact center has become a cornerstone to a successful business strategy.

The growing importance of the contact center is a recent phenomenon. Historically, customer service has been viewed by most organizations as an expensive but necessary cost of doing business, fraught with problems and inefficiencies. High call volumes regularly overwhelm under trained staff, resulting in long busy queues for customers. Inadequate information systems require most callers to repeat basic information several times. Because of this, an estimated twenty percent of shoppers abandon Web sites when faced with having to call an organization's contact center, and many more abandon calls when they encounter holding queues or frustrating menu choices. In addition, customer contact centers represent an extraordinary operating cost, consuming almost ten percent of revenues for the average business. The cost of labor dominates this expense, and the industry's extraordinarily high turnover rate results in the nonstop recruitment and training of new agents.

Unfortunately for business, the goal of ensuring cost-effective customer service is becoming more difficult. The Internet has driven an explosion in communication between organizations and their customers. Customers attach a higher value to service in the Internet economy because products and services purchased online generate a higher number of inquiries than those purchased through traditional sales channels. The contact center's role has expanded to include servicing new audiences, such as business partners, investors and even company employees. New, highly effective advertising and marketing initiatives direct customers to interact with already overburdened contact centers to obtain information. In addition to telephone calls, inquiries are now made over new Web-based text channels—including email, web-mail and chat—that place an enormous strain on customer service operations.

The combination of the growing importance of good customer service and the obstacles to delivering it make up a customer service challenge.

SUMMARY

In general, in one aspect, the invention features receiving a communication from a user, applying a concept recognition process to automatically derive a representation of concepts embodied in the communication, and using the concept representation to provide to a human agent information useful in responding to the natural language communication.

Implementations of the invention may include one or more of the following features. The arbitrary natural language communication is expressed in speech. The communication is expressed using a telephone or other voice instrument. The communication is stored in a voice mailbox. The arbitrary natural language communication is expressed in text. The text is expressed electronically. The text is expressed in an email. The text is expressed through instant messaging. The text is expressed in a manner associated with a web page. The concept recognition process is universally applicable to any communication in a natural language. The concept representation is expressed in a mark-up language. The information provided to the human agent includes an audible playback of a recorded version of the natural language communication. The playback is compressed in time relative to the communication. The information provided to the human agent includes a display of a text corresponding to the communication. The information provided to the human agent includes information about at least one prior communication or response that preceded the natural language communication. The concept recognition process is used to determine how much information about prior communications to provide to the human agent. The communication is part of a dialog between the user and a response system, the dialog including communications from the user and responses to the user, and the information provided to the human agent includes information about historical portions of the dialog. A first mode of expression of the communication from the user is different from a second mode of expression of the responses to the user. The first mode and second mode of expression comprise at least one of text or speech. The information provided to the human agent includes information about possible responses to the user's communication. A first mode of expression of the communications from the user is different from a second mode of expression of the responses to the user. The first mode and second mode of expression comprise at least one of text or speech. The information about possible responses includes a text of a possible response. The information about possible responses includes an indication of a level of confidence in the appropriateness of the response. The communication comprises a question and the response comprises an answer to the question. The communication comprises a question and the response comprises a request for additional information.

The human agent is enabled to determine how the information useful in responding to the communication is selected. The enabling of the human agent includes permitting the agent to use the communication from the user to control how the responsive information is selected. The enabling of the human agent includes permitting the agent to enter a substitute communication to control how the responsive information is selected. The substitute communication is a restatement by the human agent of the communication from the user.

The useful responding information is generated by applying the concept representation to a body of information representing other communications and their relationships to concepts. Applying the concept representation includes a matching process to determine a cluster of similar communications to which the user's communication likely belongs. A state is occupied prior to receipt of the communication, and also including selecting a transition to a next state based on the concept representation and on a set of possible transitions. The transition includes an action to be taken in response to the communication. The action to be taken comprises a reply communication. The set of possible transitions is derived from examples of state-transition-state or stimulus-response sequences. The examples include pre-run-time examples that may be voice or text. The examples occur at runtime.

The response is selected by the human agent and delivered to the user automatically without the user knowing that it was a human agent who selected the response. The response is generated by the human agent. The response is spoken or typed by the human agent. The response is selected without involvement of a human agent.

A graphical user interface is provided for a workstation of the human agent, the information useful in responding being presented in the interface, the interface being presented as part of a user interface of a third party's response system software. The user interface provides conceptual context for a communication from a user. A response is provided to the communication. The response is provided in real time relative to the communication. The response is provided at a later time relative to the communication. The communication is provided in speech and the response is provided in text.

A human agent is selected to handle a response to the communication. The human agent is automatically selected by a work distribution process. The work distribution process uses information deduced from the concept representation in automatically selecting the human agent.

In general, in another aspect, the invention features receiving an arbitrary natural language communication from a user, automatically deriving a representation of concepts embodied in the communication, and using the concept representation, automatically providing a response to the communication in a different mode of expression than the mode of expression used for the communication.

Implementations of the invention may include one or more of the following features. The response is provided in other than real time relative to the communication. The communication is provided in speech and the response is provided in text.

In general, in another aspect, the invention features initiating a dialog with a user by sending a first natural language communication to the user, in response to the first natural language communication to the user, receiving a second natural language communication from the user, applying a concept recognition process to automatically derive a representation of concepts embodied in the second communication, and using the concept representation to provide to a human agent information useful in responding to the second communication.

In general, in another aspect, the invention features receiving a set of recordings or transcripts of dialogs between users and human agents, recognizing the speech in the recordings, separating each of the dialogs into communications each of which is made by either a user or a human agent, applying a concept recognition process to derive a representation of concepts embodied in each of the communications, and automatically creating a body of state-transition-state or stimulus-response information from the concept representations that enables automated determination of appropriate responses to natural language communications received from users.

In general, in another aspect, the invention features receiving example dialogs each comprising a sequence of natural language communications between two parties, applying a concept recognition process to automatically derive a representation of concepts embodied in each of the communications, and using the sequences of communications to form a body of state-transition-state or stimulus-response information that enables a determination of an appropriate transition for any arbitrary communication that is received when in a particular one of the states.

Implementations of the invention may include one or more of the following features. The example dialogs comprise sound files and/or transcriptions of typed text. The concept representations are used to form clusters of communications that are related in the concepts that are embodied in them. The example dialogs comprise historical dialogs. The dialogs relate to contact center operation. The dialogs comprise requests and responses to the requests. The dialogs comprise real-time dialogs. The dialogs comprise a string of voice messages. The representations of concepts are expressed in a mark-up language. The communications in the cluster comprise communications that represent different ways of expressing similar sets of concepts.

In general, in another aspect, the invention features receiving an arbitrary natural language communication from a user, applying business rules to a conceptual representation of the communication to determine whether or not to refer the communication to a human agent for response, and if the business rules indicate that it is not necessary to refer the communication to the human agent, determining whether a confidence in an automatically generated response is sufficiently high to provide the response without referring the communication to the human agent.

In general, in another aspect, the invention features receiving an arbitrary natural language communication from a user, automatically selecting a level of response from among a set of different levels that differ in respect to the degree of involvement by the human agent in providing the response.

Implementations of the invention may include one or more of the following features. The selecting is based in part on an estimate of how long it would take the human agent to respond if the communication is referred to the human agent for response. The level is selected based on a level of confidence in the appropriateness of an automatically generated response. The level is selected based on business rules. The levels include a level in which the response is provided automatically. The levels include a level in which the response is generated by the human agent. The response is entered as text or spoken. The levels include a level in which the response is selected by the human agent. The selected response is delivered automatically to the user. The selected response is delivered to the user without the user knowing that the response had been selected by a human agent.

In general, in another aspect, the invention features enabling a user to access a contact service facility, receiving communications from the user at the contact service facility, providing responses to the user's communications, and enhancing the user's confidence in the contact service facility by causing at least one of the responses to be selected by a human agent based on the results of an automated concept matching process applied to the communications, the user being unaware that the human agent selected the response.

In general, in another aspect, the invention features maintaining a body of state-transition-state or stimulus-response information that represents possible sequences of natural language communications between a user and a response system, the information being generated automatically from historical sequences of communications, and using selected ones of the sequences of communications to manage human agents who provide responses to user communications.

Implementations of the invention may include one or more of the following features. The selected ones are used to train the human agents. The selected ones are used to evaluate the human agents. The sequences are used to manage the human agents by providing the agents with communications that are part of the sequences and evaluating responses of the human agents against known appropriate responses.

In general, in another aspect, the invention features maintaining a body of state-transition-state or stimulus-response information that represents possible sequences of natural language communications between a user and a response system, the information being generated automatically from historical sequences of communications, and using the body of state-transition-state or stimulus-response information in connection with the operation of a user response system.

Implementations of the invention may include one or more of the following features. The body of information is used in connection with testing of the response system. The body of information is used in connection with software processes used in the response system.

In general, in another aspect, the invention features maintaining a body of state-transition-state or stimulus-response information that enables automated determination of appropriate responses to natural language communications received from users, receiving other natural language communications from users for which appropriate responses cannot be determined, tracking actions taken by a human agent in connection with responding to the other natural language communications, and automatically inferring from the other natural language communications and the selected responses, information for inclusion in the body of state-transition-state or stimulus-response information.

Implementations of the invention may include one or more of the following features. The actions taken by the human agent include responses selected by the human agent for use in responding to the other natural language communications. An administrator is enabled to review the inferred information prior to including it in the body of state-transition-state or stimulus-response information. The actions taken by the human agent include keystrokes or mouse actions. The human agent is provided with possible responses to the natural language communications, and in which the tracking of actions includes tracking which of the possible responses the human agent chooses and inferring that the chosen response is a correct response to one of the communications. The human agent is provided with possible responses to the natural language communications, and, if the human agent responds to the communication without choosing one of the possible responses, inferring that the possible responses are incorrect. The human user is enabled to indicate that one of the possible answers was correct, even though the human user is respond to the communication without making a choice among the possible responses.

In general, in another aspect, the invention features maintaining a body of state transition-state or stimulus-response information that enables automated determination of appropriate responses to natural language communications received from users, the state-transition-state or stimulus-response information being associated with a contact center of an enterprise, updating the body of information based on communications received from users and responses provided by human agents of the contact center, and analyzing the body of information to infer knowledge about the operation of the enterprise.

In general, in another aspect, the invention features maintaining a body of state-transition-state or stimulus-response information that enables automated determination of appropriate responses to natural language communications received from users, the state-transition-state or stimulus-response information being based on concept representations derived from example natural language communications, the example natural language communications being predominantly in one language, and using the state-transition-state or stimulus-response information to provide appropriate responses to natural language communications received from users in a second language different from the one language.

In general, in another aspect, the invention features displaying to a human agent a user interface containing concept representation-based information useful in responding to natural language communications from users, the information including automatically generated possible natural language responses and indications of relative confidence levels associated with the responses.

Implementations of the invention may include one or more of the following features. The human agent is enabled to select one of the possible responses. The human agent is enabled to enter a substitute of the user's communication, and generating the possible natural language responses from the substitute communication. Controls are provided in the interface that enable the human agent to choose a level of response with respect to the degree of involvement of the human agent. The level of response includes direct conversation with the user. The level of response includes providing the response automatically.

In general, in another aspect, the invention features maintaining a body of state-transition-state or stimulus-response information that enables automated determination of appropriate responses to natural language communications received from users, the state-transition-state or stimulus-response information being based on concept representations derived from example natural language communications, each of the states having possibly multiple transitions leading to a later state, when in a predetermined one of the states, using information about the multiple transitions to improve the accuracy of recognition of a speech recognizer that is processing a spoken communication from a user.

Implementations of the invention may include one or more of the following features. The information about multiple transitions is used to improve the accuracy of discriminate matching of the concept representation of the spoken communication with clusters of concept representations in the body of information.

In general, in another aspect, the invention features enabling two-way natural language communication between each pair of a user, a human agent, and an automated response system, and facilitating the communication by representing the natural language communication as concepts and maintaining a body of state-transition-state or stimulus-response information about sequences of communications between at least two of the user, the human agent, and the response system.

In general, in another aspect, the invention features receiving natural language communications from users, automatically considering possible responses to the communications and confidence levels with respect to the responses, providing automated responses to a portion of the users based on the confidence levels, and refraining from providing automated responses to another portion of the users.

In general, in another aspect, the invention features receiving natural language communications from users, automatically recognizing concepts contained in the communications, and distributing the communications to human agents for responding to the users, the distribution being based on the concepts recognized in the communications.

In general, in another aspect, the invention features a medium bearing a body of information capable of configuring a machine to support an automated communication system, the body of information comprising state-transition-state or stimulus-response information that represents possible sequences of natural language communications occurring back and forth between a user and a response system.

Implementations of the invention may include one or more of the following features. The body of information also includes cluster information identifying clusters of variations of communications that express similar concepts, each of the transitions of the state-transition-state or stimulus-response information being associated with one of the clusters.

In general, in another aspect, the invention features an apparatus comprising a user interface for a human agent at a contact service facility, the user interface including a window containing information provided by a contact service process, the information including information about a user of the facility, and window elements embedded in the window provided by the contact service process, the elements including a list of possible natural language responses based on concept representations for an active communication of a user, and indications of relative confidence that the respective responses are appropriate for the communication of the user. In some implementations, the window elements include a place for a human agent to view text corresponding to the communication of the user, and a place for the human agent to enter a substitute text for the communication of the user.

Other advantages, features, and implementations will be apparent from the following description, and from the claims.

DESCRIPTION

Natural language processing technology based on concepts or meaning, such as the technology described in U.S. Pat. No. 6,401,061, incorporated by reference in its entirety, can be leveraged to intelligently interact with information based on the information's meaning, or semantic context, rather than on its literal wording. A system can then be built for managing communications, for example, communications in which a user poses a question, and the system provides a reply, that system is highly effective, user-friendly, and fault-tolerant because it automatically extracts the key concepts from the user query independently of the literal wording. The concept recognition engine (of the kind described in U.S. Pat. No. 6,401,061) enables the formation of appropriate responses based on what customers are asking for when they engage the underlying system in conversation over voice or text-based communication channels. The conversation may be a synchronous communication with the customer (such as a real-time dialog using voice or instant messaging or other communication via a web page) or asynchronous communication (such as email or voice mail messages). In conversations using asynchronous communication mode, responses are provided at a later time relative to the customer's inquiries.

In the example of a customer contact center, prior to runtime, the communication management system creates a knowledge base using logged actual conversations between customers and human agents at a customer contact center. Using logged conversations in this manner instead of trying to program the system for every possible customer interaction makes set up simple, rapid, and within the ability of a wide range of system administrators. The contact center administrator simply "feeds" the system the recorded customer interactions using an intuitive administrator user interface. Unlike traditional self-service systems that are incapable of quickly adapting to ever-changing business conditions, the system described here can rapidly model typical question and answer pairs and automate future conversations.

Figure 1:
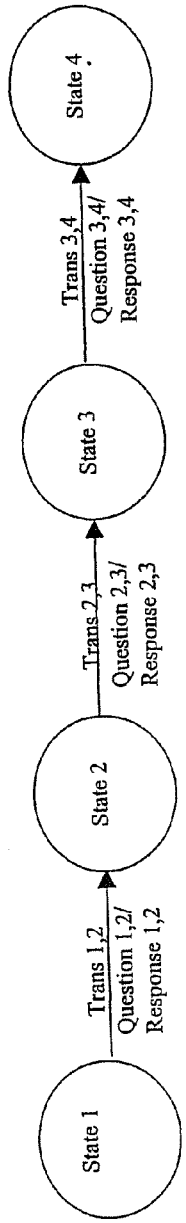
FIG. 1 shows a state transition line diagram and FIG. 1A shows a state transition graph.
Figure 1A:
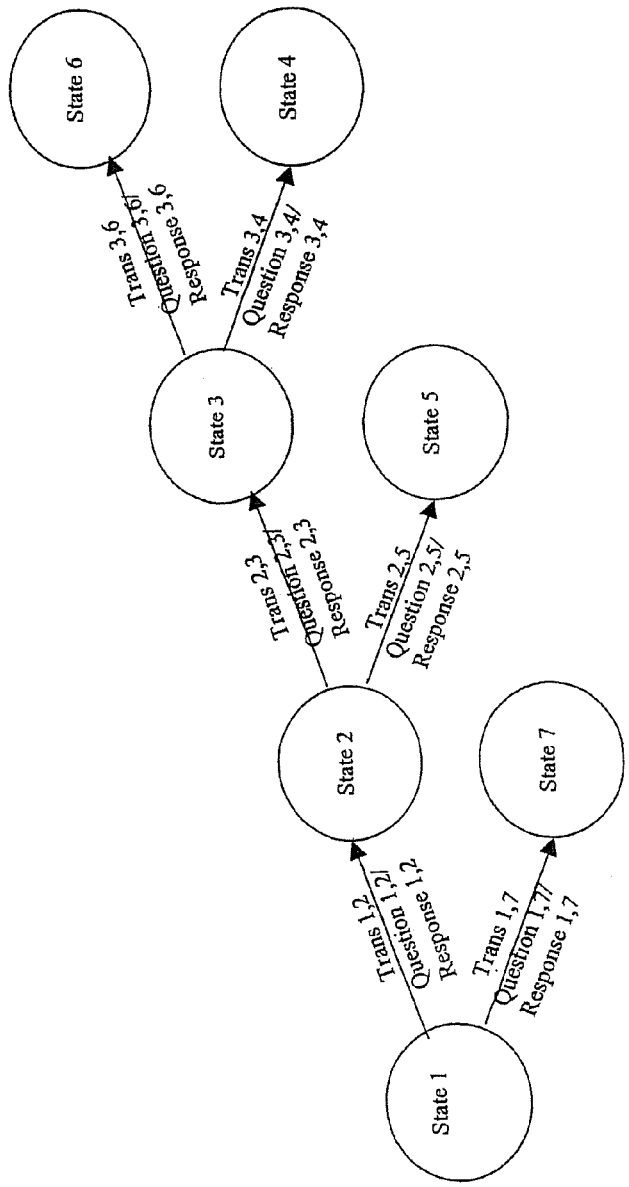

Each conversation that is processed by the system (either to build the knowledge base prior to run-time, or to process live communications at run-time) is modeled as an ordered set of states and transitions to other states in which the transition from each state includes a question or statement by the customer and a response by the human agent (or in some cases, an action to be taken in response to the question, such as posing a question back to the user). A symbolic state-transition-state sequence for a conversation that is being processed from a recorded interaction is illustrated in FIG. 1. In some implementations, the delimiter for each statement or communication by the customer or response by the human agent is a period of silence or a spoken interruption. The text for each of these statements or responses is extracted from whatever communication medium was used in the conversation, for example, text or speech. For example, speech recognition may be used to convert spoken conversation into text. Next, the system extracts key concepts from the customer's question or statement or the human agent's response. This extraction is done as described in U.S. Pat. No. 6,401,061 by creating a library of text elements (S-Morphs) and their meaning in terms of a set of concepts (semantic factors) as a knowledge base for use by a concept recognition engine. The concept recognition engine parses the text from the customer or agent into these S-Morphs and then concepts matching these S-Morphs are collected. These key concepts for a communication (question or response, in the example being discussed) can be stored as a non-ordered set and can be referred to as a "bag of concepts". Higher level organizations of the concepts into various structures reflecting syntax or nearness is also possible. After the entire set of logged conversations (i.e., dialogs) is processed, each conversation is expressed as a state-transition-state sequence. The system accumulates all of the conversation state transition sequences into a single graph so that the initial state may transition to any of the conversations. This aggregate transition graph is then compressed using graph theory techniques that replace duplicate states and transitions. The system recursively determines which transitions from a given state are duplicated, by comparing the transitions to their "concepts". Successor states of duplicate transitions from the same state are then merged into one state with all of the transitions from the successor states. The text of one of the responses of the duplicate transitions is preserved in the knowledge base as a standard response. This text can be passed back to the customer as part of a conversational exchange in the form of text or converted into voice. The resulting compressed state transition graph forms the knowledge base for the system. An example of a compressed state transition graph is illustrated in FIG. 1A. In some implementations, all of the information in this knowledge base is stored using a well-defined XML grammar. Examples of mark-up languages include Hyper Text Markup Language (HTML) and Voice Extensible Markup Language (VoiceXML). In this case, a Conversation Markup Language (CML) is used to store the information for the knowledge base.

Figure 2:
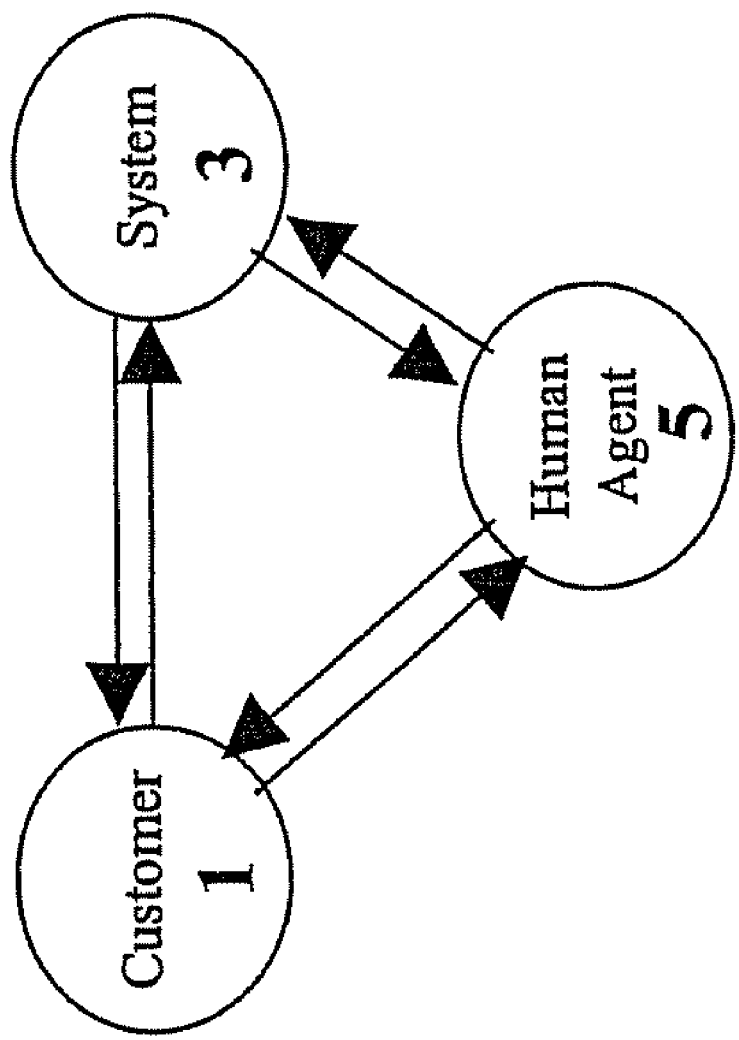
FIG. 2 shows interactions between the customer, the system, and the human agent.

Once the knowledge base has been formed, the system may proceed to an operational (run-time) mode in which it is used to manage communications in, for example, a customer contact center. The logs that were used to build the knowledge base for a given customer contact center would, in some implementations, be recorded from conversations occurring at that same customer contact center or one that is characterized by similar kinds of conversations. Using the knowledge base, the system can keep track of the current state of run-time conversations based on the state transition graph for the customer contact center. For example, after a customer makes his first communication (converted into text) with the customer contact center (for example, the user might make an arbitrary natural language spoken query), the system uses the concept recognition engine to extract the concepts from the text. Next, the system attempts to match the concepts from the text with the transitions from the initial state in the contact center's state transition graph. This matching is done by comparing the set of concepts associated with the current communication with sets of concepts stored in the knowledge base. The closer the two sets are, the more confidence there is in the accuracy of the match. If the best matching transition in the knowledge base matches the customer's text with a confidence above some threshold, then the system assumes that it has identified the correct transition, locates the corresponding response in the knowledge base, and communicates that corresponding response to the customer. The system proceeds to the next state in the state transition graph and waits for the customer's next communication. This traversal of a sequence of states and transitions may continue until either the customer terminates the conversation or the state transition graph reaches an end state. However, errors in the text received by the concept recognition engine and non-standard (or unexpected) questions or statements by the customer may require intervention by a human agent. When the customer's communication is in the form of speech, the conversion from speech to text may have such errors. Due to the possibility of such errors, in some implementations, the system does not rely on complete automation of the responses to the customer but has a smooth transition to manual intervention by the human agent when the automation is unsuccessful. In general, this type of gradual automation is suggested by FIG. 2 that shows interactions between the customer 1, the system 3, and the human agent 5. (In other implementations of the system, automated responses may be given in cases of high confidence, while no response (other than to indicate that the system is unable to respond) is given to the user.)

In some examples, the system uses speech recognition technology to engage customers in conversations over the telephone. The speech recognition technology converts the customer's speech into text that becomes input to the concept recognition engine. By integrating the concept recognition engine with speech recognition, the underlying system recognizes what the customer says by conceptually understanding what the customer means. This combination enables new levels of automation in the customer service center by engaging users in intuitive, intelligent, and constructive interaction across multiple channels. And that enables organizations to offload significant volumes of routine customer transactions across all contact channels, saving considerable expense and improving service levels.

In other implementations, these conversations with the customer may occur over audio interfaces using, for example, a VoiceXML browser, the web using an HTML browser, Instant Messenger using an IM application, email using a mail application as well as other channels not yet in use.

It should be noted that this system enables the contact center's response to use a different mode of communication than the customer's communication. For instance, the customer may communicate using voice and the contact center may respond with text or the customer may communicate using text and the contact center may respond with computer generated voice. This is accomplished by either using the saved response text directly or by converting the saved response text into computer generated speech.

In some implementations, the system provides three types or levels of conversation management and the system may switch between these during a given conversation.

1. Automated—The system is able to produce appropriate responses to the customer's requests and automate the transaction completely independently of a human agent. For example, customer A calls a company's customer contact center to inquire about their warranties on new products. Customer A is greeted by an automated system that introduces itself and gives a brief explanation of how the automated system works, including sample inquiries. He is then prompted to state his inquiry in his own words. Customer A states his inquiry in a conversational manner. The automated system informs the customer of the company's comprehensive warranty policy. The system asks customer A if the resolution was helpful and whether he has any additional questions. His question answered, customer A finishes the call.

2. Blended Agent Assist—In this mode, the system involves a human agent by presenting him with the customer inquiry and a number of suggested responses ranked by confidence/similarity ("match score"). The human agent selects one of the suggested responses, enabling the system to complete the call. The human agent can also search the system knowledge base for an alternative response by entering a question into the system. In the blended agent assist mode, the agent does not pick up the call or interact directly with the customer. The blended model is expected to reduce agent time on a call by enabling him to quickly 'direct' the system to the correct resolution. The human agent can then move on to a new transaction. For example, customer B calls a company's customer service organization to ask for an address where he can overnight payment for services. Customer B is greeted with an automated system that introduces itself and confirms the customer's name. After confirming his name, customer B is given a brief explanation of how the automated system works, including sample inquiries. He is then prompted to state his inquiry in his own words. Customer B states his inquiry in a conversational manner. The automated system asks the customer to please wait momentarily while it finds an answer to his question. The system places a call to the next available agent. While the customer is waiting, the system connects to an available human agent and plays a whisper of customer B's question. The human agent receives a screen pop with several suggested responses to the customer's question. The human agent selects an appropriate suggested answer and hits 'respond,' enabling the system to complete the interaction. The system resumes its interaction with customer B by providing an overnight address. The system asks customer B if the resolution was helpful and whether he has any additional questions. His question answered, customer B finishes the call without knowing that a human agent selected any of the responses.

3. Agent Assist Takeover.—In the takeover model, the system escalates to a human agent and the human agent takes over the call completely, engaging the caller in direct conversation. The takeover model is expected to improve agent productivity by pre-collecting conversational information from the call for the customer service agent and enabling the agent to look up information in the system's knowledge base during the call, reducing the amount of time then needed to spend on a call. For example, customer C calls a company's customer service organization to close his account. Customer C is greeted with an automated system that introduces itself and confirms the customer's name. After confirming his name, Customer C is given a brief explanation of how the automated system works, including sample inquiries. He is then prompted to state his inquiry in his own words. Customer C states that he would like to close his account with the company. The automated system asks the customer to confirm his account number. Customer C punches in his account number on the telephone keypad. The system tells Customer C to please hold on while he is transferred to an agent. The system passes the call to the appropriate agent pool for this transaction. The next available agent receives a recording of customer C's question and receives a screen pop with his account information. The agent takes over the call by asking when customer C would like to close his account.

The system switches among the three modes of conversation management based on the ability of the system to handle the situation. For instance, in automated conversation mode, if the system is unable to match the customer's inquiry with a standard question/response pair with sufficient confidence, then the system may switch to the blended agent assist mode. Furthermore, in a blended agent assist mode, if the human agent determines that none of the computer generated responses are appropriate given the customer's inquiry, then the system may switch to the agent assist takeover conversation mode and the human agent finishes up the conversation. In a preferred embodiment of this invention, the customer also has the capability to switch modes of conversation. For instance, the customer may wish to switch out of automated conversation mode. In another embodiment, the system may adjust the threshold of confidence in interpreting the customer's communication based on how busy the human agents are. This may give customers the option to try automated responses rather than waiting on busy human agents.

An additional mode of conversation management occurs when the human agent has sufficient experience with the communication patterns of the system. In this case, if the customer's communication is matched with transitions with a low level of confidence, the human agent may decide to rephrase the customer's question with substitute text that may result in a more successful match. If so, then the conversation may continue in the automated mode.

Figure 3:
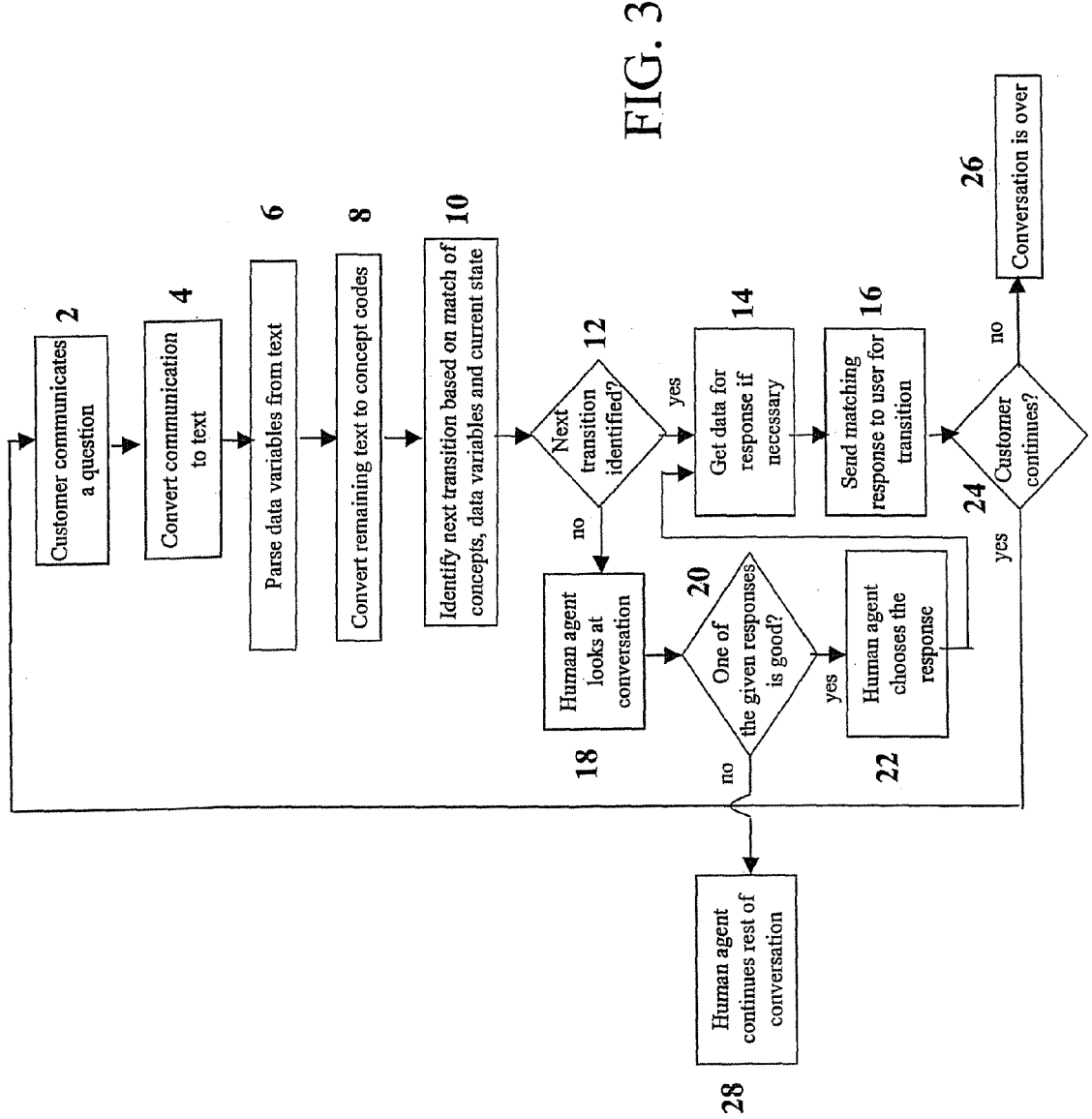
FIG. 3 is a flowchart.

Conversations between a customer and a contact center that are managed by the system using these three modes of conversation are modeled by the flowchart illustrated in FIG. 3. In this flow, first a user initiates a conversation by communicating a question or statement to the contact center (2). Next, the communication is converted into text (4). The identified transition may contain variable data that is pertinent to the subsequent response by the system. The variable data may be the customer's name or identifying number and has a specific data type {string, number, date, etc.}. The variable data (when present) is extracted from the text of the customer's communication (6). Special rules may be used to identify the variable data. Next, the concept recognition engine parses the remaining text into S-morphs and collects a "bag of concepts" matching these S-morphs (8). Next, the system identifies the transition from the current state whose concepts matches the extracted concepts from the customer's communication with the highest level of confidence (10). If data variables are expected in the transition, then matching the data type of the expected variables with the data type of extracted variables is included in the comparison. If the confidence of the match is higher than a set threshold (12), then the system assumes that the customer is on the identified transition. In this case, the system may have to look up data for the response matching the identified transition (14). For instance, if the customer's communication is a question asking about operating hours of a business, then the system may look up the operating hours in a database. Next, the system sends the matching response to the user with the extra data if it is part of the response (16). This response may be one of many forms of communication. If the conversation is over a phone, then the system's response may be computer-generated speech. If the conversation is text-based, then the response may be text. Of the response may be in text even though the question is in speech, or vice versa. If the system identifies a transition with insufficient confidence (12), then a human agent at the contact center is prompted for assistance. The human agent views a graphical user interface with a presentation of the conversation so far (18). The system also shows the human agent a list of expected transitions from the current state ranked in order from the transition with the best match with the customer's communication to the worst match. The human agent determines if one of the expected transitions is appropriate for the context of the conversation (20). If one transition is appropriate, then the human agent indicates the transition to the system and the system continues the conversation in the automated mode (14). Otherwise, if the human agent determines that no transition is appropriate for the context of the conversation, then the human agent directly takes over the conversation until its completion (28).

The system may continue expanding its knowledge base while in operational (run-time) mode. The system logs conversations between the human agent and the customer when the system is in the agent assist takeover mode. At regular intervals, these conversations are processed as in the initial creation of the knowledge base and the new state transition sequences are added to the knowledge base. One difference is that the agent assist takeover mode typically begins at a state after the initial state. Thus, one of the new state transition sequences typically is added to the aggregate state transition graph as a transition from a non-initial state. Every time a new state transition sequence is added to the aggregate state transition graph in the knowledge base, the aggregate state transition graph is compressed as described previously.

Figure 4:
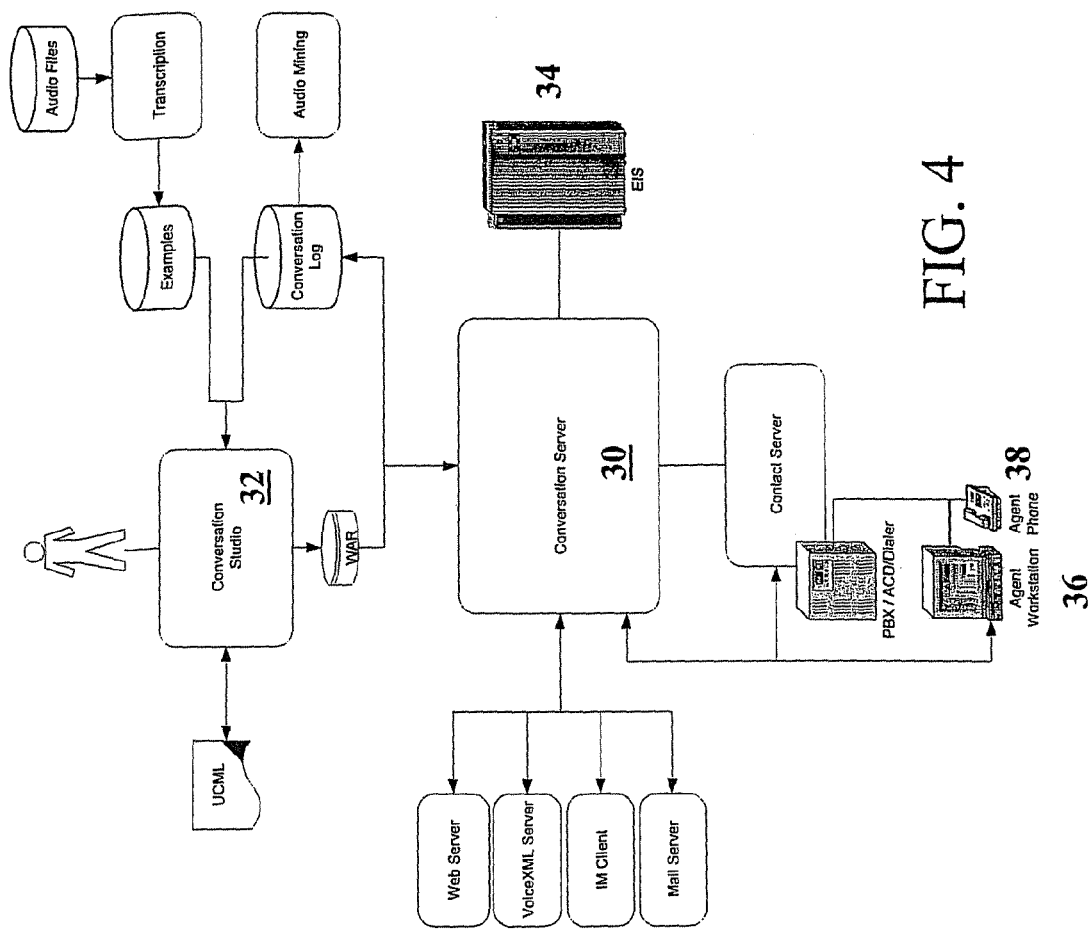
FIG. 4 is an overview of a software architecture system.

An example implementation of the system is illustrated in FIG. 4. The conversation server 30 is the run-time engine of the system. The conversation server 30 is a Java 2 Enterprise Edition (J2EE) application deployed on a J2EE application server. This application is developed and deployed to the conversation server using the conversation studio 32. FIG. 4 shows the relationship between the conversation server 30 and the conversation studio 32.

The system is a multi-channel conversational application. Within the conversation server 30, sets of automated software agents execute the system application. By multi-channel, we mean, for example, that the software agents are capable of interacting with callers over multiple channels of interaction: telephones, web, Instant Messaging, and email. By conversational, we mean that the software agents have interactive conversations with callers similar to the conversations that human agents have with callers. The system uses an iterative application development and execution paradigm. As explained earlier, the caller and agent dialogs that support the system application are based on actual dialogs between callers and human customer support agents within the contact center.

FIG. 4 also shows the relationship between the conversation server and other elements of the system. The conversation server 30 interacts with an enterprise information server (34) that accepts data originating from customers and provides data for responses to customer questions. The agent workstation 36 executes software with a graphical user interface that allows a human agent to select transitions for the system when a conversation is in the blended agent assist mode. The agent phone 38 enables the human agent to enter into a live oral conversation with a customer when the conversation is in the agent assist takeover mode.

Figure 5:
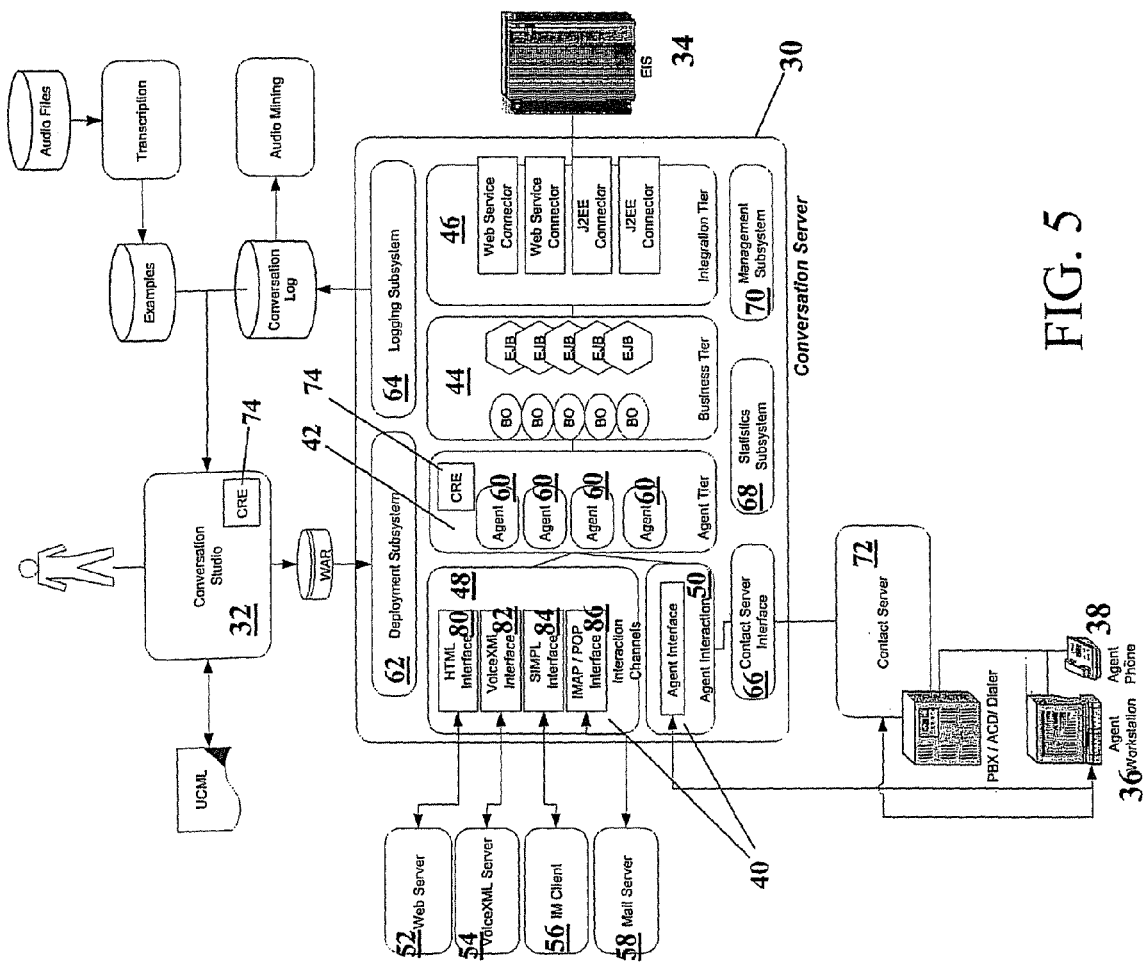
FIG. 5 is more detailed view of the software architecture of FIG. 4.

The conversation server 30's internal architecture is depicted in FIG. 5. The conversation server 30 has a core set of four tiers that support the logic of the system application. These tiers are the four tiers that are traditionally found in web application servers. They are presentation 40, workflow 42, business 44, and integration 46.

The presentation tier 40 is responsible for presenting information to end-users. Servlets such as Java Server Pages (JSPs) are the J2EE technologies traditionally employed in this tier. The presentation tier is composed of two subsystems: the interaction channel subsystem 48 and the agent interaction subsystem 50. The interaction channel subsystem 48 handles the conversation server's 30 interaction with customers over each of the channels of interaction: web 52, VoiceXML 54, Instant Messenger chat 56, and email 58. The agent interaction subsystem handles the conversation server's 30 interaction with the human agents within the contact center.

The workflow tier 42 handles the sequencing of actions. These actions include transaction against the business objects within the business tier and interactions with end-users. In the conversation server 30, the workflow tier 42 is populated by software agents 60 that understand the conversations being held with customers. In addition, these agents interact with the business objects within the business tier 44. The software agents 60 are the interpreters of the markup language produced by the conversation studio 32 (the application development system).

The business tier 44 holds the business objects for the application domain. Enterprise Java Beans (EJBs) are the technology traditionally employed in the business tier. The conversation server does not introduce system-specific technology into this tier. Rather, it employs the same set of components available to other applications deployed on the J2EE application server.

The integration tier 46 is responsible for the application server's interface to databases and external systems. J2EE Connectors and Web Services are the traditional technologies employed in this tier. Like the business tier 44, the conversation server 30 does not introduce system-specific technology into this tier. Rather, it employs the traditional J2EE components. The value of a common integration tier is that any work to integrate external systems is available to other applications deployed on the J2EE server.

Surrounding the core set of four tiers is a set of subsystems that facilitate the operations of the conversation server 30. These subsystems are deployment 62, logging 64, contact server interface 66, statistics 68, and management 70.

The deployment subsystem supports the iterative, hot deployment of system applications. This fits within the iterative application development where conversations are logged and fed back to the conversation studio 32 where personnel within the contact center may augment the application with phrases the system application did not understand.

The logging subsystem 64 maintains a log of the conversations that software agents 60 have with customers and customer support agents. This log is the input to the iterative application development process supported by the conversation studio 32.

The contact server interface (CTI) 66 provides a unified interface to a number of CTI and contact servers 72.

The statistics subsystem 68 maintains call-handling statistics for the human agents. These statistics are equivalent to the statistics provided by ACD and/or contact servers 72. Call center operations folks may use these statistics to ensure that the center has a sufficient workforce of human agents to serve the traffic the center is anticipating.

The management subsystem 70 allows the conversation server 30 to be managed by network management personnel within the enterprise. The subsystem 70 supports a standard network management protocol such as SNMP so that the conversation server 30 may be managed by network management systems such as HP OpenView.

Figure 6:
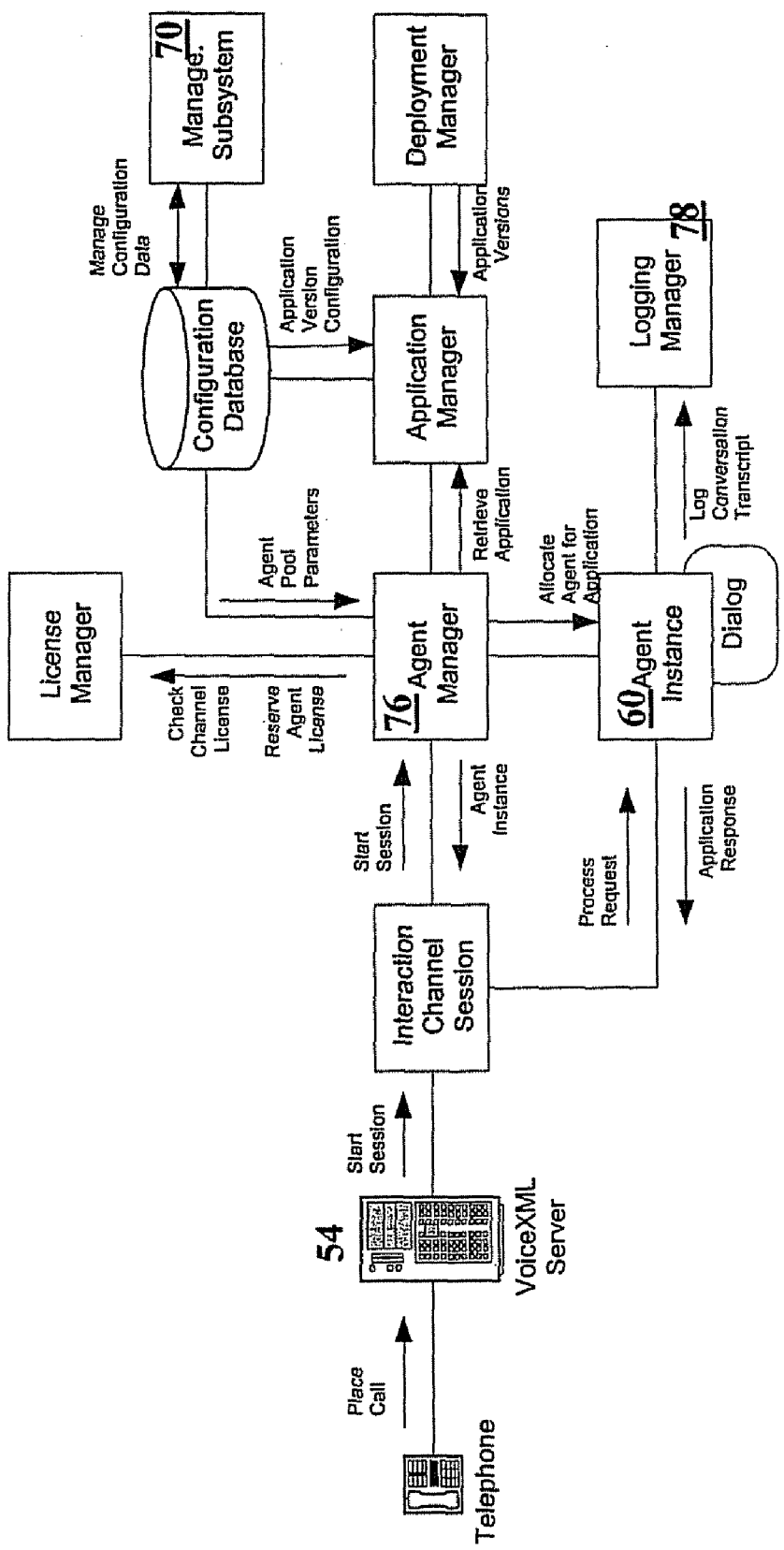
FIG. 6 is a block diagram of workflow components system.

FIG. 6 shows the components of the workflow tier 40 of the system. Software agents 60 are the primary entity within the workflow tier 40. Software agents 60 are the automated entities that hold conversations with customers, human agents within the contact center, and the back-end systems. All of these conversations are held according to the applications developed and deployed by the conversation studio 32. The functional requirements on the workflow tier 40 are:

Allocate, pool, and make available software agents capable of handling any of the applications deployed to the conversation server 30. This agent pooling capability is similar to the instance pooling capability of EJBs. It also fits within the workforce management model of contact centers.

The interaction channel allocates a software agent 60 and requests that the software agent 60 handle a particular application. The workflow tier 40 interacts with an application manager that manages the applications. The application manager will select the version of the application to employ (as instructed by the application deployer).

The software agent 60 checks with the license manager to ensure that interactions are allowed over the requesting channel. If not, the software agent 60 returns an appropriate response.

Software agents are capable of holding multiple dialogs at once. Software agents may hold a conversation with at least one customer while conversing with a human agent during resolution of a response. This capability may be extended to have agents talking to customers over multiple channels at once.

Software agents 60 hold the conversation according to the application developed in the conversation studio 32.

Software agents 60 call the concept recognition engine 74 to interpret the customer's input in the context that it was received and act upon the results returned.

Each software agent 60 maintains a transcript of the conversation it is having. This transcript is ultimately logged via the conversation logging subsystem. The transcript contains the following information all appropriately time stamped:

The application being run

The path through the dialog with the customer including:

The customer input as both recognized text as well as the spoken phrase.

The state of the dialog (context, transitions, etc.)

The results of meaning recognition

The actions the software agent takes based on the meaning recognition results.

The output sent to the customer.

One of the actions the software agent 60 may take is to request the assistance of a human agent. This will result in a sub transcript for the dialog with the human agent. This transcript contains:

Queue statistics for the agent group at the beginning of the call

When the call was placed and picked up

A sub-transcript of the agent's actions with the call including:

Whether the agent assists or takes over

Actions the agent takes in assisting; for example, selecting from the list of responses presented by the software agent 60, adjusting the query and searching the knowledge base, creating a custom response.

Whether the agent marks a particular response for review and the notes the agent places on the response.

The agent's instructions to the software agent 60.

The workflow tier 42 will produce the statistics for the pool(s) of software agents 60. These statistics will be published via the statistics subsystem 68.

The operating parameters governing the workflow tier 42 (e.g., minimum and maximum agents/application, growth increments) will be retrieved from the configuration database managed via the management subsystem 70.

FIG. 6 shows the components that make up the workflow tier 42—the agent manager 76 and the agent instance. The agent manager 76 handles the pooling of agent instances and the allocation of those instances for particular application. The agent manager 76 is responsible for interacting with the other managers/subsystems that make up the conversation server 32 (not shown is the agent manager's 76 interaction with the Statistics subsystem 68). Each agent instance 60 logs a conversation transcript with the Logging Manager 78.

The presentation tier consists of two subsystems: the interaction channels 48 and the agent interaction subsystem 50.

Figure 7:
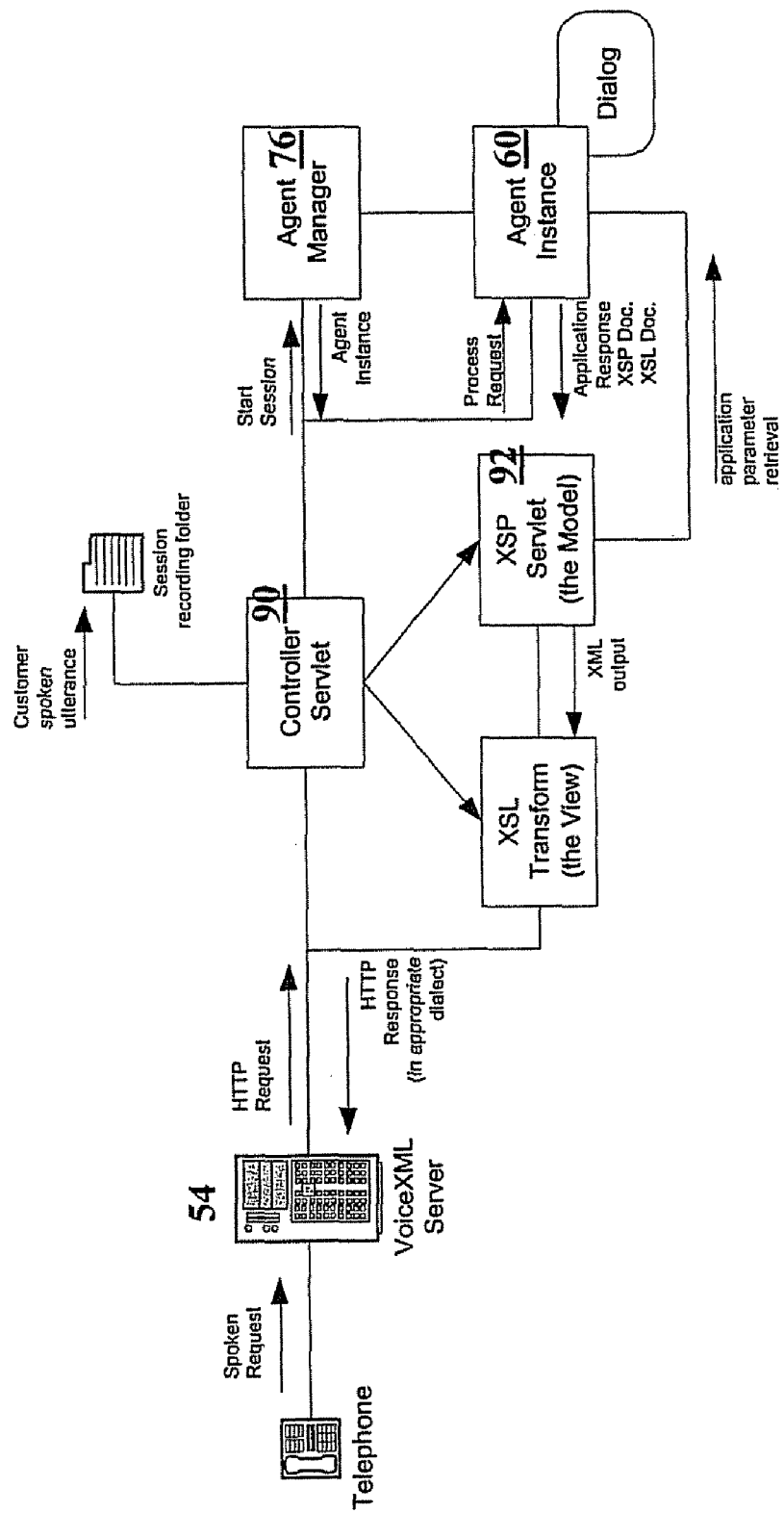
FIG. 7 is a block diagram of interaction channel components.

There is an interaction channel associated with each of the modes of interactions supported by the conversation server: HTML 80, VoiceXML 82, Instant Messenger 84, and email 86. The interaction channel subsystem 48 is built upon the Cocoon XSP processing infrastructure. The interaction channel 48 processing is depicted in FIG. 7. The functional requirements of the interaction channels are:

Initiate, maintain, and terminate an interaction session for each conversation with a customer (end-user). As part of that session, the interaction channel will hold the agent instance that manages the state of the dialog with the customer.

Determine the channel type and application from the incoming Uniform Resource Locator (URL). The URL may take the form of http://host address/application name.mime type?parameters where host address=IP address and port; application name=deployed name of the application; MIME type=indicates channel type (e.g., html, vxml, etc.); parameters=request parameters.

For HTML and VoiceXML channels, to pass the HTTP request to the agent for processing. For the IM and email channel, to perform an equivalent request processing step.

To translate the channel-independent response to a channel-specific response using the appropriate document definition language (HTML, VoiceXML, SIMPL, SMTP, etc.). This translation is governed by XSL style-sheets. The definition of responses and processing style-sheets is part of the application definition and returned by the agent in reply to each request processing invocation. The definition of responses and XSL style-sheets fall into three use cases. The interaction channel is not particularly aware of these use cases.

The response document and the XSL style-sheet are defined at a channel basis for the application. The response document requests the contents of the CML <output> tag as well as other artifacts generated from the CML (e.g., grammar file).

In the "file" use case, the user defines the response document within the application. The response document is processed using the XSL style-sheet defined at the channel. The response document must adhere to the DTD that governs response documents. This DTD allows for multi-field forms to be defined.

In the "open" use case, the user defines the response document as well as the XSL style sheet. No restrictions are placed on either document and the conversation server 30 is not responsible for any results with respect to the processing of the response.

This translation handles both the transformation to the channel-specific document language and the branding of a response for a particular client.

For the VoiceXML channel 54, the interaction channel 82 is responsible for logging the recorded customer request and informing the agent of the location of the recording for inclusion in the conversation log and/or passing in the whisper to a human agent. As stated previously, the interaction channel subsystem 48 is implemented using the Cocoon infrastructure. The Cocoon infrastructure provides a model-view-controller paradigm in the presentation tier 40 of a web application server infrastructure.

A servlet 90 (the controller) handles the HTTP requests and interacts with the agent instance 60 to process the request. The agent instance 60 returns the response XSP document and the XSL style-sheet to apply to the output of the document.

The XSP document (the model) is compiled and executed as a servlet 92. The document requests parameters from the agent instance to produce its output—an XML stream. An XSP document is the equivalent of a JSP document. Like JSP processing, XSP compilation only occurs if the XSP document has changed since the last time it was compiled.

The XML stream is transformed according to the XSL style-sheet (the View) to the language specific to the interaction channel (e.g., HTML, VXML).

The human agent interaction subsystem (AIS) is responsible for establishing a dialog with a human agent within the contact center and managing the collaboration between the software agent and human agent to resolve a response that is uncertain. The subsystem is also used when a transfer of an application is requested in an application. The agent interaction subsystem interacts with the CTI Server Interface to execute the connection within the contact center. The CTI Server Interface also provides the agent interaction subsystem with queue statistics that may alter its behavior with respect to the connection to the agent group. The agent interaction subsystem (AIS) does the following actions:

Initiate, maintain, and terminate a dialog with a human agent within the contact center to resolve a response that is in question. The human agent is a member of a specified agent group designated to handle resolutions for this particular application.

As part of initiating a dialog with an agent, the AIS allocates and passes a handle to the agent session that allows the human agent's desktop application to collaborate in the resolution of the response.

The AIS provides an application programming interface (API) through which the human agent's desktop application is able to retrieve the following: the customer request and suggested responses currently requiring resolution; the threshold settings that led to the resolution request and whether the resolution request is due to too many good responses or too few good responses; the customer's interaction channel type; the transcript of the conversation to date; the current state of the workflow associated with this customer conversation, for example, the number of times that human agents have assisted in this conversation, the length of time the customer has been talking to a software agent, the state (context) that the customer is in with respect to the conversation and potentially, some measure of progress based on the state and time of the conversation; and the current application (and network) properties.

The AIS API also allows the human agent to: select the response to return to the customer, modify the request and search the MRE database, and potentially select the response to return to the customer, take over the call from the software agent; and mark a request/response interaction for review in the conversation log and associate a note with the interaction.

The AIS API also exposes the JTAPI interface to allow the human agent to log into/out of the contact server 72 and manage their work state with respect to the contact center queues.

The AIS API employs a language-independent format that allows it to be accessed from a number of implementation technologies.

The AIS supports the routing of voice calls from the VoiceXML server 54 to the contact center and the subsequent association of those voice calls with a particular agent session.

The AIS allows an application designer to define the presentation of application data to the human agent. This presentation should use the same XSL processing employed in the interaction channel (82, 84, 86, or 88).

Part of the human agent interaction subsystem is an agent desktop application that allows the contact center agent to handle a resolution call. This application takes two forms:

Generic Human Agent Desktop. This desktop operates in non-integrated Customer Relations Management (CRM) environment and runs as a separate process on the agent's desktop connected to the CTI and CS server.

CRM Component. This desktop is packaged as a component (ActiveX component or Applet) that runs within the context of a CRM package.

Figure 8:
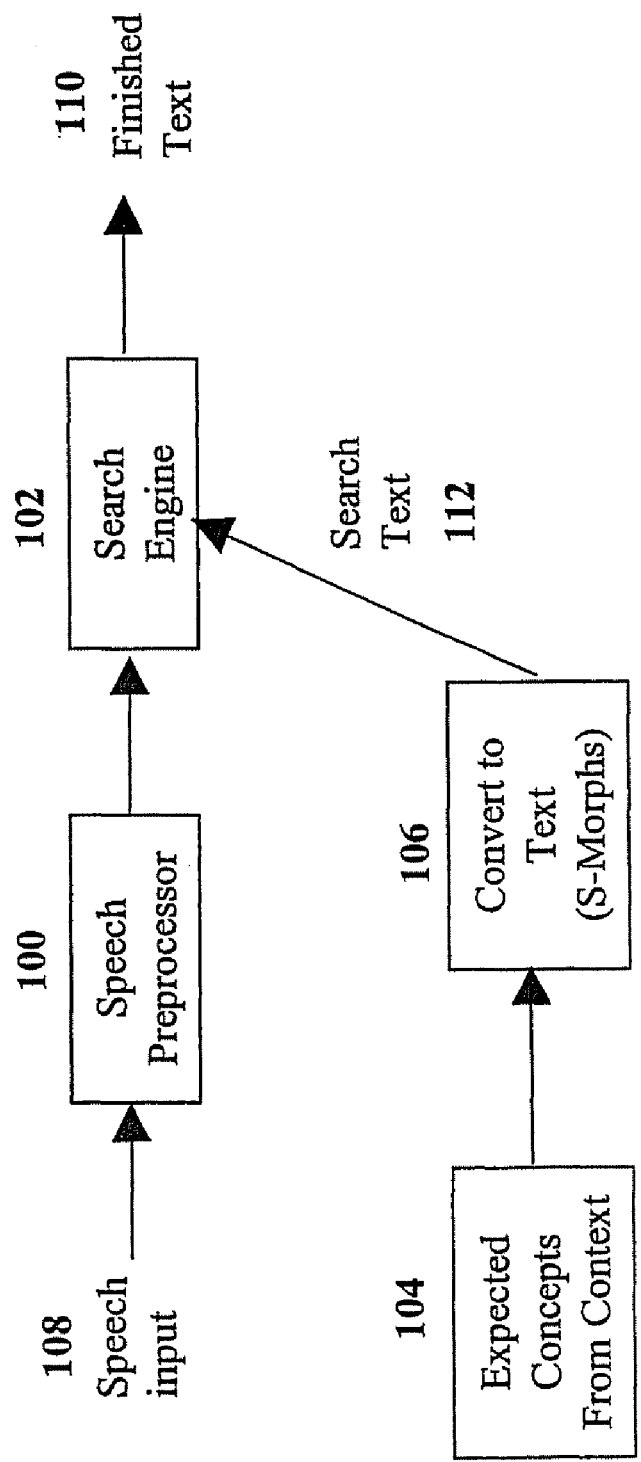
FIG. 8 is a block diagram of a speech recognizer.

Speech recognition is the art of automatically converting human spoken language into text. There are many examples of speech recognition systems. In implementations of the system in which the customer converses over the phone, speech recognition is the first step in matching the customer's communication with appropriate responses. Typical speech recognition entails applying signal processing techniques to speech to extract meaningful phonemes. Next, a software search engine is used to search for words from a dictionary that might be constructed from these phonemes. The speech recognition portion of the system guides this search by knowledge of the probable context of the communication. The block diagram of this speech recognition portion of the system is illustrated in FIG. 8. As described previously, the system has access to a knowledge base consisting of a markup language, CML, that defines a state transition graph of standard conversations between the customer and the contact call center. Because a software agent keeps track of the current state of the conversation, it can look up all of the probable transitions from this state. Each of these transitions has a "bag of concepts" or a "bag of S-Morphs" 104. These S-Morphs 104 may be converted into matching text 112. The aggregation of the matching text from all of the probable transitions is a subset of all of the words in the dictionary. In general, it is more efficient to search to match a subset of a group rather than the entire group. Thus, the search engine 102 for this speech recognizer first tries to match the phonemes of the customer's communication against the text 112 from all of the probable transitions. The search engine 102 searches in the dictionary for any remaining combination of phonemes not matched with this text.

The concept recognition engine used in some implementations of the system is an advanced natural language processing technology that provides a robust, language independent way of understanding users' natural language questions from both textual and audio sources. The technology automatically indexes and interacts with information based on the meaning, or semantic context, of the information rather than on the literal wording. The concept recognition engine understands the way people really talk and type, enabling the system to intelligently engage users in complex conversations independent of phrasing or language, to facilitate access to desired information.

The concept recognition engine is based on a morpheme-level analysis of phrases, enabling it to produce an "understanding" of the major components of the encapsulated meaning. This technique is computationally efficient, faster than traditional natural language technologies and language independent—in addition to being extremely accurate and robust.

Most other systems that apply natural language processing use syntactic analysis to find synonymous phrases for the user's entry. The analysis first identifies every word, or component of a word, in the phrase using extremely large linguistic dictionaries. Next, the systems attempt to match these elements to specific entries in a rigid list (i.e. word or keyword indices). As a result, these systems use matches based on the level of character strings; if at least one character is different from the target index entry, the match fails. With the concept engine used in some implementations of the system, the mapping is not based on a fixed set of words, phrases or word elements, but on a fixed set of concepts.

As a result of its emphasis on semantic processing, the concept recognition process is intrinsically robust—it works extremely well with "noisy" input data. This is useful to the system's ability to recognize the spoken word using speech recognition software. The system employs a process to accurately recognize meaning in real-world conversational interaction, despite common typographical mistakes, errors generated by speech recognition software, or out-of-context words. Users can say any combination of words, and the system is flexible enough to understand the users' intent.

The concept recognition engine is based on algorithms that create and compare semantic labels. A semantic label for a piece of text of any length is a short encoding that captures the most important components of its meaning. When items in the source data store(s) are labeled with semantic tags, they can be retrieved, or managed in other ways, by selectively mapping them to free-form voice or text queries or other input text sources—independent of the actual words and punctuation used in these input text sources. For example, a user asking the system "How can I bring back pants that don't fit?" will be provided with relevant information from an organization's return policy database, even if the correct information does not contain the words "pants" or "bring back" anywhere within it. Alternatively worded user queries seeking the same information are conceptually mapped to the same return policies, independent of the actual words used in the input string.

This approach bridges the gap between the advantages of statistical language model automatic speech recognition (SLM ASR) software and finite-state grammar ASR. This technology is called the concept recognition engine (CRE), a natural language processing algorithm.

The concept recognition engine (CRE) provides a robust, language independent way of understanding users' natural language questions from both textual and audio sources. The technology is an advanced natural language processing technology for indexing, mapping and interacting with information based on the meaning, or semantic context, of the information rather than on the literal wording. As opposed to the majority of other natural language efforts, the technology does not rely on a complete formal linguistic analysis of phrases in an attempt to produce a full "understanding" of the text. Instead, the technology is based on a morpheme-level analysis of phrases enabling it to produce an "understanding" of the major components of the encapsulated meaning.

Morphemes are defined as the smallest unit of language that contains meaning, or semantic context. A word may contain one or several morphemes, each of which may have single or multiple meanings. A relatively simple example of this is illustrated using the word geography that is comprised of the morphemes geo, meaning the globe, and graph that means illustration. These two distinct morphemes, when combined, form a concept meaning the study of the globe. Thus, individual units of meaning can be combined to form new concepts that are easily understood in normal communication.

The technology is based on algorithms for creating and comparing semantic labels. A semantic label for a given piece of text of any length is a short encoding that captures the most important components of its meaning. When the items in a "database" are labeled with semantic tags, they can be selectively retrieved or mapped to by parsing user-generated free-form text queries or other types of input text strings—independent of the actual words and punctuation used in the input strings.

CRE determines context in tandem with the SLM ASR by analyzing the resulting engine output and assigning semantic labels which can then be compared to an indexed database of company information. Furthermore, the CRE helps to suppress the effects of speech recognition errors by ignoring those words most commonly misrecognized (the small words) and using the more context-heavy words in its analysis. The effect, therefore, of the CRE is to enable self service systems that accurately recognize meaning in real-world conversational interaction, despite common typographical mistakes or errors generated by speech recognition software. More simply put, the combination of these two technologies enables systems to recognize what you say by understanding what you mean.

At design time, the CRE automatically indexes the data that will be searched and retrieved by users. In conversational applications, this data is the transcribed recordings of customer conversations with call center agents, but any set of textual information (documents, Frequently Asked Questions (FAQ) listings, free-text information within a database, chat threads, emails etc.) can be indexed using the CRE. Indexing is the process by which the CRE groups or 'clusters' data according to its conceptual similarity. Unlike the traditional alphabetical indices, the clusters created by the CRE are special conceptual references which are stored in a multi-dimensional space called concept space. They are 'labeled' using a set of primary atomic concepts (the basic building blocks of meaning) that can be combined to generate the description of any concept without having to manually create and maintain a specialized and very large database of concepts. Because concept indexing enables information to be searched or managed based by their meaning instead of words, a much more efficient, fault-tolerant and intelligent dialog management application can be developed. Through this clustering process, the CRE also extracts the transitions between clusters (i.e. the call flow) and generates an index that will later map free-form customer inquiries to agent responses found in the call log.

At run time, in some examples, the CRE performs this same process on customer inquiries in real-time. It takes the output from the speech recognition engine and breaks it down into its associated morpheme set using morphological analysis techniques. The system handles cluttered input data well, including misspellings, punctuation mistakes, and out of context or out order words, and there are no preset limitations on the length of the input phrase.

The CRE then uses concept analysis to convert morphemes into the primary atomic concepts described above, assembles this set of atomic concepts into a single concept code for the entire input and then maps that code to its equivalent code within the indexed data. In a conversational application, this process essentially 'points' user input to a system dialog state that may be a system response, existing interactive voice response (IVR) menu tree, or instruction to query transactional systems for customer account information.

This process yields a robust means of automatically recognizing and "understanding" highly ambiguous, conversational user queries within the context of a contact center self-service application.

The effect of this combination of CRE and SLM speech recognition is to enhance the ability to make information available to customers through automation. Corporate information that does not neatly fit into a five-option IVR menu or pre-defined speech grammar can be made available through a conversational interface. Because the resulting customer input has context associated with it, more options become available for how systems intelligently handle complex interactions.

The application of a vector model approach to semantic factors space instead of words space provides the following benefits:

1. The transition itself from words to concepts moves from being more statistical to being more semantic.

2. The traditional vector model is often called a "bag-of-words model" to underline combinatorial character of model ignoring any syntactic or semantic relationship between words. By analogy we can call the vector model a "bag-of-concepts model". In the traditional vector model we calculate some external parameters (words) statistically associated with internal parameters of our interest—concepts. In the vector model we calculate concepts directly.

1.3. As long as the number of semantic factors is much smaller than the number of words even in a basic language the computational intensity in the vector model is considerably lower. Other machine learning techniques can be used to form a confidence based ranking of matches. For example, one could use decision tree induction or construction of support vector machines. Combinations of learning techniques using boosting would also be possible.

We have described above separate parts of the whole two-step cycle of the model work:

Input Language Text Object>Semantic Label>Output Language Text Object. It is important to see that the two steps in the cycle are clearly independent. They are connected only through the semantic label which is an internal "language" not associated with any of human languages. This feature makes it possible and relatively easy in any application to change the language on both the input and the output side.

The first step is essentially language-dependent. It means that switching to a different language requires automatic generation of the semantic label for a phrase in a given language. Below we describe two possible ways of solving this problem. The second step is based on the semantic index. The index itself does not care about the language of the objects, it just points to them and the semantic labels associated with pointers are language-independent. There is no language-specific information in the semantic index.

A first approach is compiling new S-Morph dictionaries for the new language. For each human written language a set of S-Morph can be compiled. The compilation process may be based on an analysis of a vocabulary either from a large corpus of text or from a big dictionary in this language.

Having such a complete set of S-Morphs in one language (English) is useful for creating a similar set of S-Morph in another language. As a starting point we may try to look just for morphemic equivalents in the second language. This reduces the effort of an otherwise labor-intensive corpus analysis in the second language. It is especially true when we move from language to language in the same group of languages because such languages share a lot of lexical "material". The set of Spanish S-Morphs is about the same size as the English one. The examples of Spanish S-Morphs are: LENGU, FRAS, MULTI, ESPAN, SIGUI.

After this is done we may need some tuning of the algorithm of S-Morph identification. The good news about this algorithm is that most of its job is common for the languages of the same group. Even when switching from English to Spanish without any changes in the algorithm, the results were satisfactory. Few if any changes may be needed for most of the Indo-European languages. The Spanish experiment demonstrated the power of system's cross-language capabilities: after we have compiled Spanish morphemes Spanish as an input language became possible for all applications previously developed for English.

Figure 9:
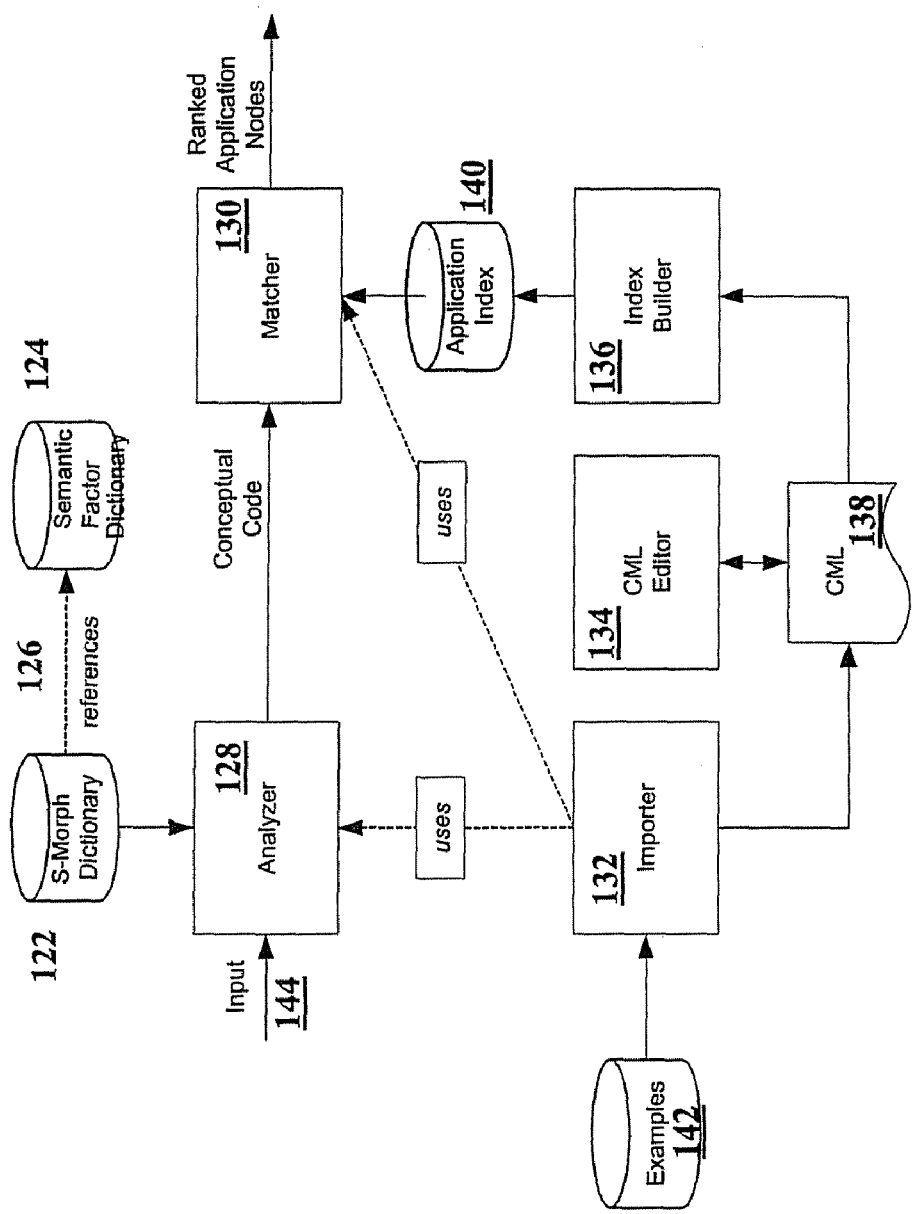
FIG. 9 is a block diagram of a concept recognition engine.

A language knowledge base is used to store the information needed for the concept recognition engine. This knowledge base has three major components: semantic factor dictionary, S-Morph dictionaries and synonym dictionary. Each entry in the semantic factor dictionary includes:
 a) Semantic factor name;
 b) Semantic factor definition/description;
 c) Example of a word concept code which uses this semantic factor. Each entry in the S-Morph dictionaries includes:
 a) S-Morph.text;
 b) Semantic factor concept code with separate parts— Sememes for alternative meanings of polisemic morphemes;
 c) In multifactor codes labels for head factors to which modification can be applied. A functional block diagram of the concept recognition engine is illustrated in FIG. 9. The blocks of this diagram are described as follows. The S-Morph dictionary 122 and Semantic Factor Dictionary 124 are used the Analyzer 128 to produce a set of concept codes.

Next, the CML file is generated on the basis of examples 142. This results in a CML file that is data driven on the basis of a thesaurus. The next step is to do lookup and editing of the CML file. This lookup and editing consists of the following steps:

a) Displaying string occurrences with different search criteria;
 b) Adding a new paraphrase;
 c) Adding a new pair question-answer;
 d) Removing a paraphrase or few paraphrases;
 e) Removing a pair question-answer (with all paraphrases) or few pairs;
 f) Merging two pairs question-answer (with the choice of input and output phrases);
 g) Splitting one pair into two pairs with assigning of input and output phrases;
 h) Editing phrases (including group editing).

Next, the CML file is taken as input information at any point of editing and an index is built. Subsequently, two entries are matched and a similarity calculation with a specified CML/index is done. This may be done for two phrases; for two concept codes; for a phrase and a concept code; for two phrases, for two concept codes, or for a phrase and a concept code in a cyclic mode with one of the inputs coming each time from the feeding file; and for automatic matching and similarity calculation with one of the inputs coming each time from the feeding file and the results stored in an output file. Next, preanalysis parsing is done by creating pseudofactors for names; processing single-word and multi-word personal names; processing single-word and multi-word names for businesses and products; and generating part-of-speech tags.

At this point, application control and testing is performed. This consists of the following steps:
 a) Analyzing a file of input conversations both by cycles and automatically with differences with previous processing of the same file either displayed or sent to the output file.
 b) Control of the similarity threshold;
 c) Delta interval (gap in similarity between the first and second match);
 d) Control of the number of matches returned.

The conversation mark-up language's (CML) main goal is to specify a set of instructions to the conversation server for handling "conversations" with customers in an automated or semi-automated manner. Automated conversations are those that are handled entirely by the conversation server from beginning to end. Semi-automated conversations are handled first by the conversation server, and then passed off to a human agent, along with any information that has been collected.

CML is a markup language that specifies the following:
 Customer inputs, including paraphrases that the conversation server can process.
 Conversation server outputs (e.g. TTS and/or audio files) to respond
 The flow of a conversation. This flow is describe using a set of state transition networks which include:
 Contexts in which each input and output can occur.
 Transitions to other contexts, based on customer input and the results from Java objects.
 Calls to back end business tier objects
 Inline application logic
 In addition to the CML language for describing the conversations between the conversation server and user, the CMLApp language allows applications to be constructed from reusable components.

In some examples, the CML describes the request/response interactions typically found in particular customer support contact centers which include the following:
 General information requests such as stock quotes, fund prospectus requests, etc.

Customer-specific request such as account balances, transaction history, etc.

Customer initiated transactions such as a stock/fund trade, etc.

Center-initiated interactions such as telemarketing, etc.

CML is designed to be interpreted and executed by a conversation server (CS). As explained earlier, the CS has the set of software agents that interpret CML based applications. These agents are fronted by a set of interaction channels that translate between channel specific document language such as HTML, VoiceXML, SIMPL, SMTP and CML's channel-independent representation, and visa versa.

A CML document (or a set of documents called an application) forms the conversational state transition network that describes the software agent's dialog with the user. The user is always in one conversational state, or context, at a time. A set of transitions defines the conditions under which the dialog moves to a new context. These conditions include a new request from the user, a particular state within the dialog, or a combination of the two. Execution is terminated when a final context is reached.

Four elements are used to define the state transition networks that are the dialogs between the software agent and the user: Networks, Context, Subcontext, and Transitions.

A network is a collection of contexts (states) and transitions defining the dialog a software agent has with a user. There may be one or more networks per CML document each with a unique name by which it is referenced. In addition to defining the syntax of a dialog with the user, a network defines a set of properties that are active while the network is actively executing. These properties hold the data that is being presented in the output to the user as well as data that govern the execution of the network. For example, the pre-conditions of transitions and post-conditions of context are defined in term of properties.

Contexts represent the states within the dialog between software agents and users. Every context has a set of transitions defined that take the application to another context (or loops back to the same context). A context represents a state where a user's request is expected and will be interpreted. Certain contexts are marked as final. A final context represents the end of the dialog represented by the network.

A subcontext is a special context in which another network is called within the context of the containing network. Subcontexts are liked subroutine calls and there is a binding of the properties of the calling and called network. Subcontexts may be either modal or non-modal. In a modal subcontext, the transitions of its containing network (or ancestors) are not active. In a non-modal subcontext, the transitions of its containing network (and ancestors) are active.

A transition defines a change from one context to another. A transition is taken if its precondition is met and/or the user request matches the cluster of utterances associated with the transition. If a transition does not define a precondition, then only a match between the user request and the transition's utterances is required to trigger the transition. If a transition does not define a cluster of utterances then the transition will be triggered whenever its precondition is true. If neither a precondition nor a cluster of utterances is defined, the transition is automatically triggered. The triggering of a transition results in the execution of the transition's script and the transition to the context pointed to by the transition.

Figure 10:
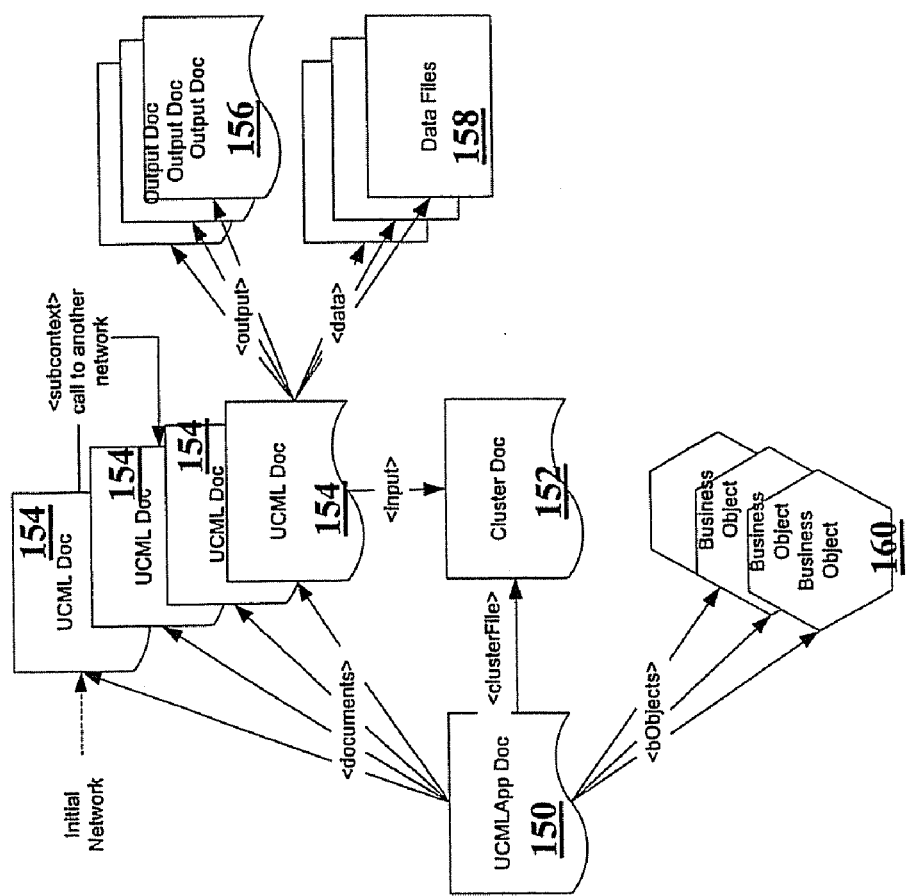
FIG. 10 is a view of an organization of markup language documents.

In some examples, a CML application requires a single CMLApp document, a single CML document, and a cluster document. A multi-document application entails a single CMLApp document, a single cluster document, and multiple CML documents. FIG. 10 shows the relationships of a CMLApp document 150, CML documents 154, a cluster document 152, output documents 156, referenced data files 158, and business objects 160.

Appendix 1 sets forth the text of an example of a CMLApp document named "abc12app.ucmla, a CML cluster document named "abc12clusters.ucmlc", and a CML document named "abc12ucml.ucml". The CMLApp document specifies the cluster file using the mark-up "clusterFile" and the CML file using the mark-up "document". The CMLApp document also specifies the channel of communication with the customer using markup "channel type". In this case, the channel type is "VXML". First, the cluster document stores the text of all of the recorded communications from customers that were grouped together into a cluster for a given transition from a given state or context. In the example cluster document, clusters are named c1 through c41. Data variables associated with the clusters are specified using the mark-up "variable" and have such types as "properName", and "digitString". These clusters are referenced in the example CML document. A CML document defines the state transition graph (or network). The example CML document defines a set of states (denoted by mark-up "context name") and transitions (denoted by mark-up "transition name"). For instance, lines 11-16 of the CML document are as follows: TABLE-US-00001 "<context name="s0" final="false" toToAgent="false">. <transitions> <transition name="t0" to="s1"> <input cluster="c7">yeah I'd like to check on the my account balance please </input> <output> do you have your account number sir </output> </transition>

Figure 11:
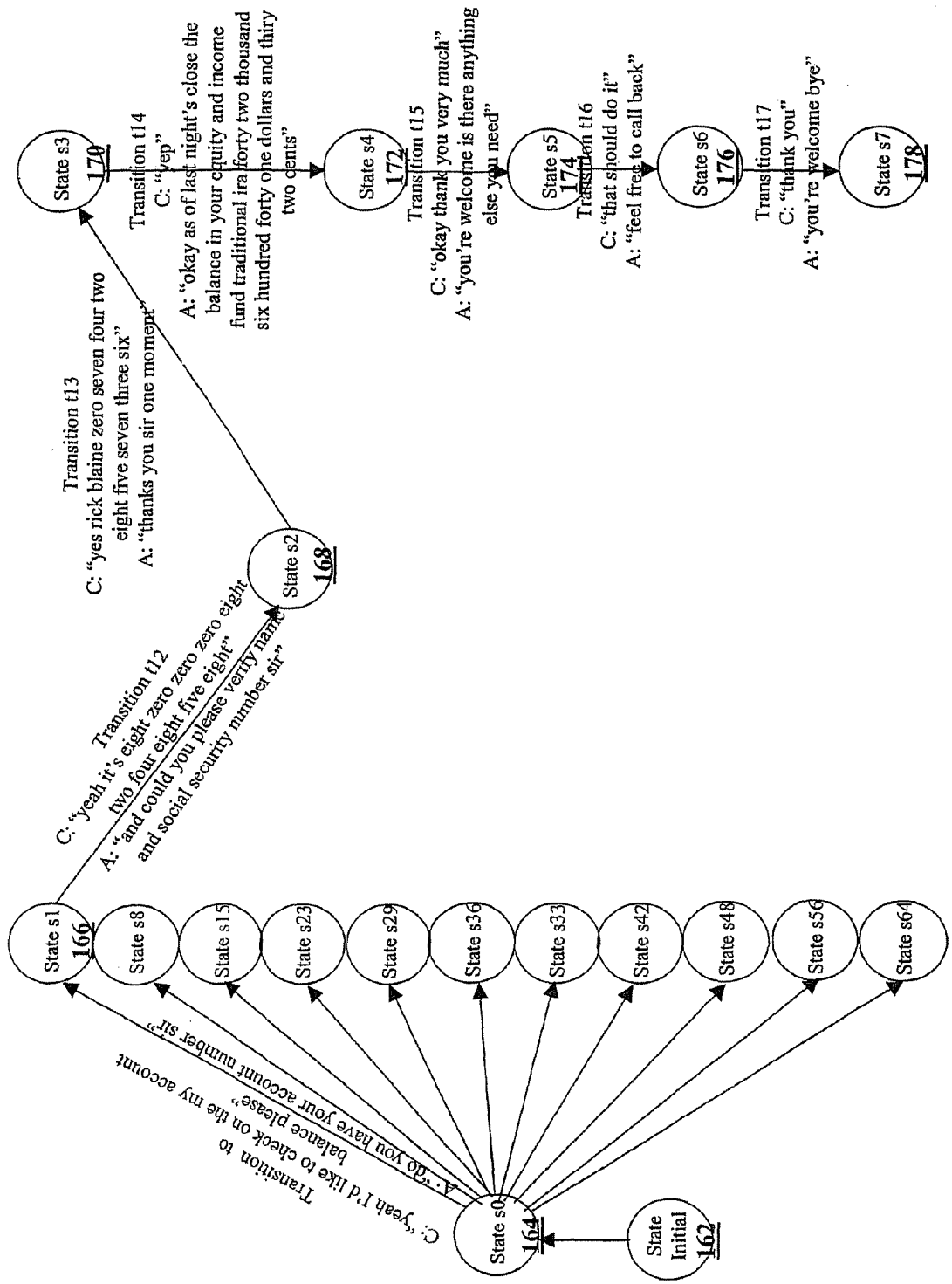
FIG. 11 is a view of a subset of the state transition graph for an example graph.

Lines 11-16 specify that there is a state (or context) s0 that has a transition t0 to state (or context) s1. Transition t0 has a customer communication "yeah I'd like to check on the my account balance please" and a contact center response "do you have your account number sir". FIG. 11 illustrates a subset of the total state transition graph defined by the example CML document. This subset includes the transitions from the initial state to s0 (162) to s1 (164) to s2 (166) to s3 (168) to s4 (170) to s5 (172) to s6 (174) and finally to s7 (176).

Figure 12:
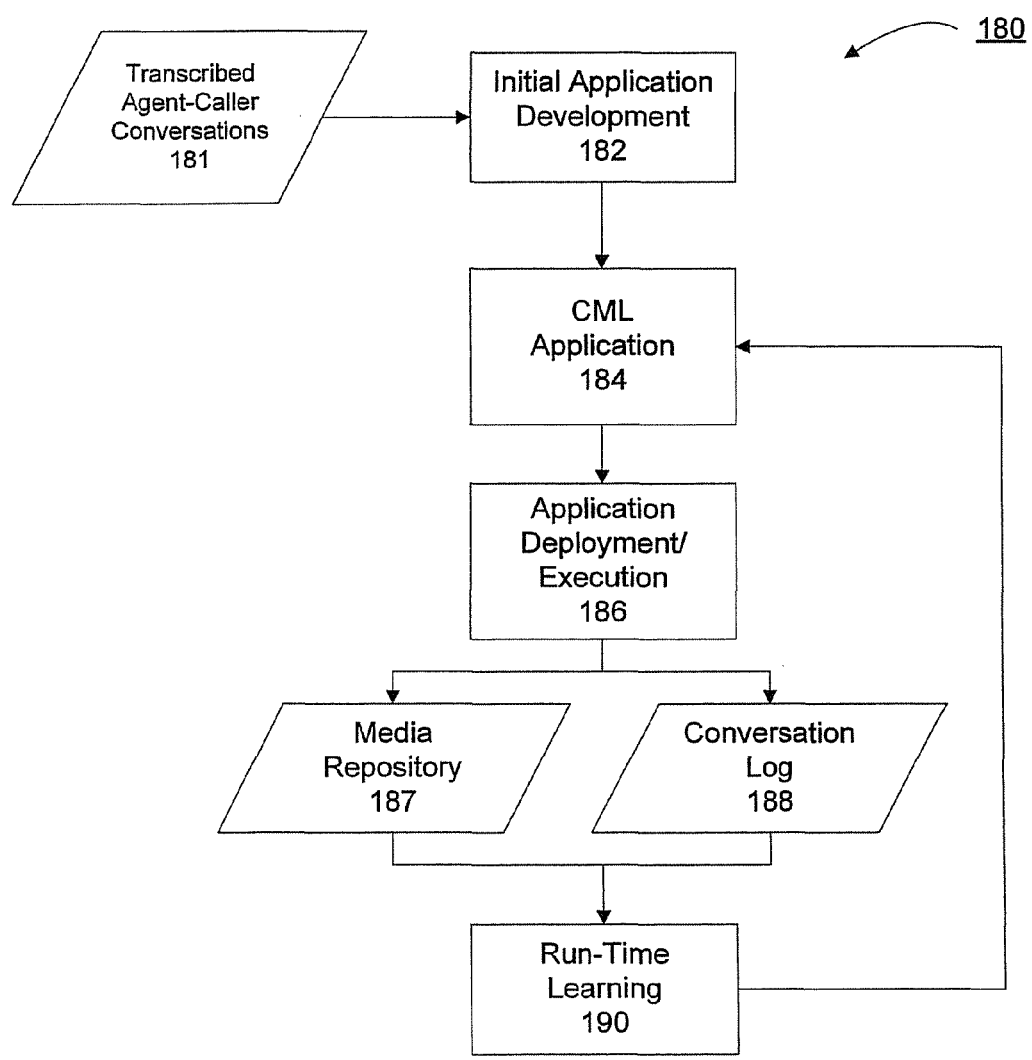
FIG. 12 is a view of an iterative application development process.

The development of a system application uses an iterative development process as illustrated in FIG. 12. The activities within this process are transcription 180, initial application development 182, application deployment 184, and iterative application development 186.

The capture of an initial set of dialogs between live customer support agents and callers facilitates the initial development of an application. In voice-only contact centers, we employ the quality assurance audio recording facilities of the contact center to capture these dialogs. These audio recordings are transcribed into transcripts of the dialog 190 between the caller and the customer support agent. The transcript take the following form: Agent: "How may I help you?" Customer: "I was calling to check on my account balance". Agent: "May I have your social security number?" Customer: " . . . ". These dialogs 190 are the examples 188 that feed the initial application development 182 in the form of Import Markup Language (IML) files.

The initial application development 182 takes the examples and builds a CML application. This is a four-phase process that results in a deployable CML application.

The phases are as follows:

Phrase Induction Phase. In the phrase induction phase, the statements made by agents and callers are parsed into sentences of terminals and non-terminals and a set of tag rules describing the syntax of sentences is developed.

Clustering Phase. In the clustering phase, the statements by agents and callers are clustered according to their conceptual factors. The concept recognition engine is the principal tool applied in this phase.

State Generation Phase. In this phase, the dialogs are captured as finite state networks or context free networks using subContexts. The CML element, context (or state), is the principal state definition construct.

Code Insertion Phase. Finally, the state networks are annotated with code to effect the automation associated with the dialog.

Once a CML application has been developed, it must be deployed to the conversation server. The conversation server supports hot-deployment of CML applications. By hot-deployment, we mean that a CML application may be re-deployed when it is already running on the CS platform. Hot-deployment ensures the following properties of the CML application: the already active application sessions will be allowed to run to completion; all resources employed by a version of an application (e.g., prompt files, etc.) will not be removed or replaced until no longer required; all new application sessions will make use of the newest version of the application; all obsolete versions of the application, and supporting resources, will be removed from the conversation server when no longer needed by active application sessions. The hot-deployment of a CML application is a critical enabler of the iterative application development paradigm as it allows for graceful round-trip engineering.

The conversation server produces a log 192 of the dialogs that occur in each CML application. This log 192 indicates the state transition path taken in each dialog and the events (e.g., agent assistance, data exceptions) that caused the path to be followed. This log 192 is organized according to the state transition network defined in the CML application. The log is available to facilitate adjustments to the CML application. As the log 192 and application 194 are both structured according to the same state transition network, this iterative application adjustment has more of a local optimization flavor than the initial application development; for example, unrecognized caller statements may be added as appropriate paraphrases and/or inputs in a state. At times, the application developer may feel that the collection of unrecognized statements may warrant a new pass at defining the overall application structure. If so, a version of the initial application development 182 will be initiated.

The conversation server's support for the iterative development process is a combination of the hot deployment feature described previously and the logging of conversational sessions. The conversation log should record the following items:

The channel(s) over which the agent and caller are interacting.

The system application name and version.

The sequence of states that the conversations that the agent and caller traverse.

The events that cause the state transitions; e.g., customer support agent selecting a particular response.

The content of the conversation; e.g., voice file and recognized text on the VoiceXML channel.

The documents for the system are automatically created. First, recorded transactions may be collected in the form of WAV files that represent live recordings (a la CDC) or collected from recording system such as WISE or NICE. Other implementations of the method may use manual transcription that transforms WAV files into text. For text systems such as instant messaging the direct transcripts are used.

The transcribed file format definition is as follows:
a: Hello my name is Natalie, how can I help you?
c: I would like to speak to Ted.
a: One moment while I transfer you
c: Thank you.

From this text of conversations, word and tag lists are generated to transform the text into a mark-up language. For example, the preceding text is transformed as follows: TABLE-US-00002 <Dialog><A>Hello my name is Natalie, how can I help you? </A><C>I would like to speak to Ted. </C><A>One moment while I transfer you </A><C>Thank you. </C></Dialog>

Next, in the vocabulary construction phase, the following is generated:
Unknown Word List
Tag dictionary
Pronunciation dictionary
S-Morph/semantic factor Check Next, in the clustering phase, clusters are auto-labeled, a cluster similarity matrix is created, small clusters are cutoff, a centroid to the head of each cluster is generated, and counts are generated.

Next, the contact system administrator does manual checking of the generated CLM knowledge base. Actions performed on the knowledge base may include further merging or splitting, preserving clusters within manually merged clusters.

Next, states are generated using the following techniques: thresholds, conservative, merging states—"unions OK", and code prep. Subsequently, states may be manually merged by the contact system administrator.

After the initial deployment of the system, the system may continue in the learning mode and expanding its knowledge base. To do this, the system logs all customer interactions. The logging will be used in both the run-time operation of the system and to facilitate offline adding of new interactions to system. The system call logging is integrated with other subsystems that record, transcribe, and import customer interactions.

The system call logging system collects and stores information on every call that is handled by the system platform. The system call logging system acts as a repository of information that is gathered by a variety of subsystems to add new interactions and continually improve the system's performance.

To facilitate this process, the system call logging system creates a session object for every call that the system processes. The session object includes data associated with a specific call. The session object includes the following:

The application being run (there may be multiple conversational applications in use)

A label indicating how the interaction was processed by the system: automated, blended, agent takeover conversation modes.

A channel indicator (telephone, Web, chat/IM, email)

A link into the associated audio file stored in the audio repository.

A representation of the entire conversation in chronological order that includes: customer input recognized by the speech engine (recognized input); if automated, the answers given to each question and their match scores; for blended interactions the top suggested answer(s) and related match scores, the answer selected by the agent and its match score, if appropriate, any answer customized by agent; for takeover interactions the audio dialog between agent and customer.

Timestamps collected from system call recording subsystem: time of origination; time escalated; completion time A transcription field. The transcription field will be populated with text of the actual interaction after it has been transcribed via the transcription system. The field will be empty until the call has been transcribed.

The call recording subsystem records all interactions processed by the system. The system call recording subsystem include the following:

The system call recording subsystem records all customer calls from the time or origination (when the system begins handling the call) through the call's termination. For agent takeover calls, the system call recording subsystem will continue recording the agent/customer interaction to its conclusion.

The system call recording subsystem utilizes technology to eliminate silences in the recorded conversation.

For all calls that require agent intervention, the system passes the most recent customer input to the agent ("whisper) to provide the agent with context for the call.

The system call recording subsystem stores the recorded calls in a database (audio repository).

The system recording function timestamps the following events for each audio file created during run time: call origination, call automation, call escalation, call blended (when agent hits respond), agent takeover, and call conclusion The system also provides data on call handling performance. For instance, the system provides a mechanism for providing a real-time view of the system as well as tracking historical call handling information. This data can be presented in one of several ways:

It can be passed to existing workforce management applications via third party integrations.

It can be presented in a graphical data view via a 'reporting console' in the conversation studio.

It can be presented to the administrator via third party reporting mechanisms (for example, Crystal reports).

At a minimum, the preferred embodiment of the system provides the following basic information:

Real-time snapshot information

Calls in progress

Calls incoming—calls being routed to the system from external carriers

Calls handled—all calls processed by system (Calls automated, Calls blended, and Calls taken over)

Calls abandoned—calls abandoned in queue for agent

Blended Service levels (percent of calls blended in length of time)

Historical call tracking information

The system also learns from the answers selected by call center agents for escalated interactions. The system includes a mechanism for learning over time from how agents handle escalated interactions. The learning loop improves the system's productivity without adversely affecting reliability. The learning loop enables the system to get more confident about automating interactions that are blended by agents, as well as adding interactions that are taken over by the agent. For blended calls, the learning loop uses information collected by the call logging and transcription system to add new user questions to existing clusters. Because the call log specifies which answer, or state, the question belongs to, the learning loop simply presents the administrator with new questions (paraphrases) to be added to an existing cluster. This is done during the normal import process.

For agent takeover calls, the learning loop requires new interactions to be added and approved by the administrator via the conversation studio importer. The learning loop also enables the agent to correct the answer that is presented to them, even though they take over the call and speak with the customer.

The learning loop process is not completely automated, but requires the administrator to approve new additions. The system includes conferring the ability to manage the system to a contact center administrator. The administrator logs onto the conversation studio and runs the importer feature. The Importer takes all of the new interactions contained in the call logging system that have been transcribed and presents the administrator with a 'cluster' of interactions labeled with a representative question asked in the cluster. The administrator can any time zero in (double click) to browse and listen to individual interactions between customers and agents that make up the cluster.

The administrator determines that the cluster is a new interaction that must be added to the run time system. The administrator accepts the 'representative question' provided by the log wizard. The administrator composes an answer to the question.

The administrator runs through a series of dialogs whereby the wizard presents the administrator with individual (or grouped) interactions contained within the cluster. The administrator provides a yes/no response for each of these, indicated whether they should be included with the new cluster or not. The administrator finishes the wizard.

Because the added interaction is considered a 'low value' interaction, the administrator assigns a low confidence threshold to the interaction pair in order to maximize automation rates. The administrator tests how this threshold setting will affect automation/blended/error rates. This testing involves using actual recorded interactions to test against the system settings. The results are presented in a written (or graphical) reporting format. After reviewing the results of this testing and analysis, the administrator approves the new interaction and moves on to the next item in the log.

When the administrator has reviewed all of the interactions flagged by agents, she closes the design and test system and deploys the new run time system to the server.

All interactions escalated to a human agent will present the human agent with the audio recording ("whisper") of the customer inquiry. This whisper is automatically played to the human agent when the current interaction appears in the human agent's queue as the current item. Played audio should represent enough recorded information to be useful to that agent in resolving the customer question. For example, in addition to hearing the most recent customer utterance, the human agent may need to rewind the recording further to hear the previous interaction. The human agent uses a graphical user interface that provides the following information about the conversation:

Dialog history of system interaction with customer

Suggested ranked answers to customer inquiry

Match scores for suggested answer

Notification that customer has already been blended

To maximize the agent's productivity, pre-collected information in both a standard format, as well as a format that can be customized by the administrator. This includes confirming that the populated fields were accurately recognized, letting agents drag and drag from the system agent screen to a third party application, and having the system 'fill-in' fields in a third-party application.

For example, the information passed to the agent can appear in several formats. In addition to the dialog history previously described, the agent is able to access a standard style sheet that has all the information 'known' about the caller. This style sheet can be customized by the deploying organization, enabling it to present the pre-collected information to the agent in a way that he is familiar with and increases his productivity. A good example of this is the mortgage application process—the agent would receive the normal system screen pop with the pre-collected data already placed in an application. From the system agent screen, the agent is able to select the collected information and drag and drag or copy/paste to a third party system. Or, in fully integrated environments, the system may 'populate' those third-party systems with pre-collected information so that the agent does not have to manually move information between desktop applications.

The system agent desktop application offers the following key functionality to the agent: Takeover the call; look up information in system knowledge base; rewind, fast forward and listen to audio recording of complete customer inquiry; the system reduces the length of audio as much as possible by removing silence etc. in order to minimize agent time; select the system suggested responses and push them to customer through the system (blended workflow); If customer has asked to speak to an agent or otherwise indicated that the system has provided an incorrect response (e.g., hitting zero or asking to speak to a "human" or "supervisor"), agent desktop application alerts the agent to this fact so that he can takeover the call. For example, this could be similar to the blended alert. Both of these alerts notify that agent that he should takeover the call. Other features include edit/amend suggested responses by typing into answer field and the ability to initiate above functions via hot keys.

Another feature of the system is the so called "Wizard of Oz configuration" which enables agents to watch how the system is automating customer calls and intervene at any time to blend or takeover a call. The Wizard of Oz configuration is meant to serve as a confidence building measure as organizations prepare to fully deploy the system within their call centers.

Another confidence building measure is the use of a feedback mechanism for initial rollout and testing whereby the system gives the customer a chance to provide feedback on performance of system. Via the phone, system will ask user question to validate performance or accuracy of answer.

Figure 13:
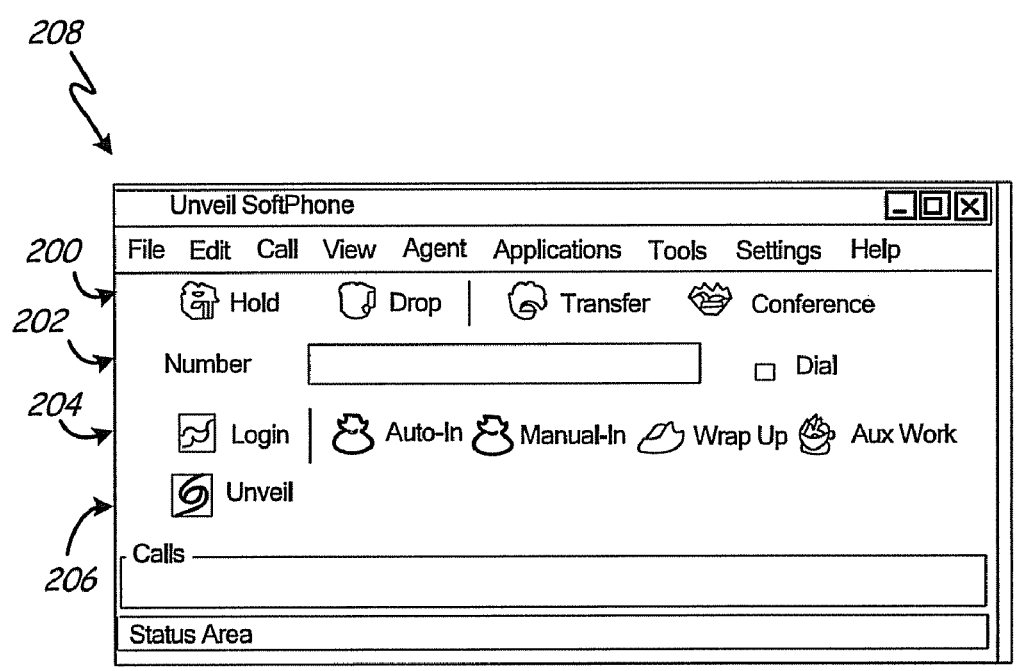
FIG. 13 is a screen shot.

FIG. 13 depicts the graphical user interface 208 which is a component of the generic agent desktop that allows an human agent to log into workgroups, manage his work state, and receive and place calls; all through interactions with the CTI server. The user interface 208 is the control panel through which the agent launches applications that employ the CTI server including the desktop application.

The interface 208 is modeled on the Avaya IP Agent desktop. The most common functions of the desktop are exposed via toolbars. The toolbars shown in FIG. 13 are: Phone 200 (provides control over the selected call), Dial 202 (provides a means of placing a call), Agent 204 (provides means of setting the agent's work state with respect to the ACD), and Application 206 (provides a means of launching applications that have been loaded into the interface 208).

Upon a human agent's login, a configuration for the desktop is loaded from the server. Part of this configuration is a definition of the applications that may be launched from the desktop. The application configuration includes the classes that implement the application and the net location from which to load the application. In addition, the configuration will include the application data that indicates that a call is targeted at the application.

Figure 14:
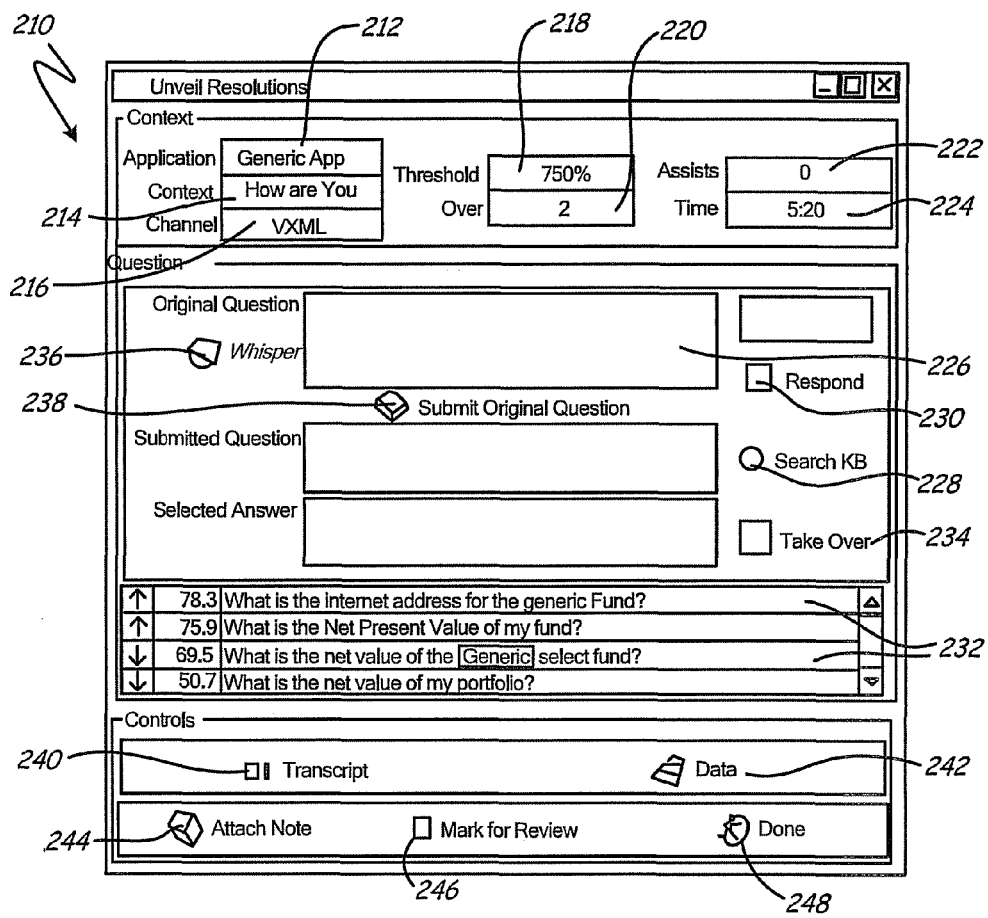
FIG. 14 is another screen shot.

FIG. 14 depicts the resolution application or graphical user interface 210. This application is triggered every time a call arrives with application data indicating that the call is a resolution call. The application user interface is broken into three main sections. The presented information is as follows: Application 212 (The CML application being run), Context 214 (The current state within the application), Channel 216 (The channel through which the customer has contacted the center), Threshold 218 (The threshold setting for the context), Over/Under 220 (The reason why the resolution has been presented to the agent; i.e., either there are too many answers over the threshold or not enough answers over the threshold), Assists 222 (The number of times the customer has been assisted in this session), and Time 224 (The length of time that the customer has been in this session).

Within the question resolution panel 226, the human agent is able to select a proper answer to the customer's question. The actions that the agent can perform in this panel are: Search KB 228 (to modify a query and search the knowledge base for answers), Respond 230 (To instruct the software agent as to respond to the customer with the selected answer. Answers 232 matching a query are displayed in the table at the bottom of the panel. Each answer 232 indicates whether it is over or under the context confidence threshold, its match ranking, and a summary of its question.), Take Over 234 (To take over a call from the software agent), Whisper 236 (To hear the recording of the customer's request), and Submit Original Question 238 (To submit the customer's original question as a query to the knowledge base. This is the initial action performed by the application.).

The graphical user interface 210 also enables a human agent to enter in substitute text for the customer's communication in the box titled "Substitute Question". If the confidence levels of the computer generated responses are low, the human agent may decide to rephrase the customer's communication in such a manner that the human agent knows that the system will match it better.

There are two sets of controls at the bottom of the user interface: transcript and data. Transcript button 240 launches a web page that shows the transcript of the software agent's dialog with the customer in a chat style transcript. This web page is generated from the software agent's running transcript of the conversation through the same Cocoon infrastructure used in the interaction channels. Data button 242 launches a web page that shows the application data that has been collected to date by the software agent. This web page is generated from the software agent's application and network properties through the same cocoon infrastructure used in the interaction channels. As with the interaction channels, it is possible to define the presentation of this data at an application level, network level, and/or context level with the definition at the more specific level overriding the definition at more general level; e.g., a definition at the context level will override the definition at the network or application level.

The Wrap-Up Controls allow a human agent to provide guidance that is placed in the conversation log. Attach Note button 244 allows the human agent to attach a note to this interaction in the conversation log. Mark for Review checkbox 246 is used to indicate that this interaction should be marked for review in the conversation log. Done button 248 indicates that the agent is done with this resolution. The system proactively indexes, categorizes and monitors archived voice and text-based conversations for quality assurance, dispute resolution and market research purposes. Because it is completely automated, the system can proactively monitor call archives for deviations in customer call patterns, alerting supervisors through regular reporting mechanisms.

For instance, in the category of conversation mining, the system transcribes customer audio for later data mining (e.g., quality control for financial services). This involves taking transcribed conversations from batch recognition process, CRE utilized to cluster logs, and provides the ability to search within clusters for specific topics (i.e. promotions, problem areas etc.). The system may also cluster call by specific topic (sub-cluster), locate and mark deviations in call patterns within sub-clusters, and enable administrator to access specific point within audio stream where deviation occurs. This functionality provides an audit trail for what agent says. For example, a cluster about product returns might indicate that different agents direct customers to return products to different locations. To do this, clusters retain data associated with log before multi-pass ASR. For another example, clusters might show that some agents associate existing answer in knowledgebase with a customer question (blended workflow), while other agents pick up the call (takeover workflow) and provide their own response.

Although certain implementations of the invention have been described, including a particular application to contact center management, a wide variety of other implementations are within the scope of the following claims.

What is claimed is:

1. A computer-implemented method comprising:
    receiving a natural language communication from a user;
    utilizing a processing component that is a functional component of the computer to apply a concept recognition process to automatically derive a representation of concepts embodied in the natural language communication;
    selecting a collection of information likely to be useful in responding to the natural language communication, wherein selecting comprises identifying the collection of information as corresponding to said representation of concepts;
    providing, through an interface that is a functional component of the computer, the collection of information to a human agent;
    receiving, through an input device that is a functional component of the computer, an identification of a particular item of information from the collection of information, the particular item being a sub-set of the collection of information, the sub-set being a particular proposed response to the natural language communication; and
    delivering the particular proposed response to the user.

2. The method of claim 1, wherein selection a collection of information comprises applying a matching process so as to automatically determine a cluster of similar communications to which the representation of concepts corresponds.

3. The method of claim 1, further comprising initiating a dialog with the user by sending an initial communication to the user, wherein said natural language communication is provided in response to the initial communication.

4. The method of claim 1, wherein the collection of information provided to the human agent includes an audible playback of a recorded version of at least a portion of the natural language communication received from the user.

5. The method of claim 4, wherein the audible playback is compressed in time relative to the natural language communication received from the user.

6. The method of claim 1, wherein the collection of information provided to the human agent includes a display of text indicative of at least a portion of the natural language communication received from the user.

7. The method of claim 1, wherein the collection of information provided to the human agent includes a record of additional communication from the user received prior to said receiving of the natural language communication.

8. The method of claim 7, wherein said record of additional communication from the user is a record of a number of additional communications from the user received prior to said receiving of the natural language communication, and wherein said number is a value determined at least in part based on which concepts are included in the representation of concepts.

9. The method of claim 1, wherein the natural language communication is received by way of a first mode of communication and the particular proposed response is delivered by way of a second mode of communication, the first mode of communication being different than the second mode of communication.

10. The method of claim 1, further comprising:
    receiving, from the human agent, an edit to the particular proposed response; and
    applying the edit to the particular proposed response before the particular proposed response is delivered to the user, wherein applying the edit comprises altering content of the particular proposed response.

11. A computer-implemented method comprising:
    receiving, at a server, a communication from a user;
    processing the communication at the server to identify a concept associated with the communication;
    presenting to an agent a set of candidate responses based on the identified concept, wherein the set of candidate responses is limited to responses that are identified by the server as being consistent with the identified concept;
    presenting the set of candidate responses to an agent for selection of a response to the received communication;
    receiving, from the agent, a selection from the set of candidate responses generated by the server; and
    delivering to the user the response to the communication selected by the agent from the set of candidate responses.

12. The method of claim 11, wherein the communication is received by way of a first mode of communication and the response is delivered by way of a second mode of communication, the first mode of communication being different than the second mode of communication.

13. The method of claim 12, wherein only one of the first and second modes of communications is a speech mode of communication.

14. The method of claim 12, wherein only one of the first and second modes of communications is a text-based mode of communication.

* * * * *